United States Patent
Roy et al.

(10) Patent No.: US 9,953,012 B2
(45) Date of Patent: Apr. 24, 2018

(54) METHOD AND SYSTEM FOR WEB PAGE MARKUP INCLUDING NOTES, SKETCHES, AND STAMPS

(71) Applicant: eGain Communications Corporation, Mountain View, CA (US)

(72) Inventors: Ashutosh Roy, Los Altos, CA (US); Sam Hahn, Saratoga, CA (US); Yonatan Goraly, Menlo Park, CA (US); Anthony Liatsis, Santa Clara, CA (US)

(73) Assignee: EGAIN CORPORATION, Sunnyvale, CA (US)

( * ) Notice: Subject to any disclaimer, the term of this patent is extended or adjusted under 35 U.S.C. 154(b) by 288 days.

(21) Appl. No.: 14/024,602

(22) Filed: Sep. 11, 2013

(65) Prior Publication Data

US 2014/0173393 A1 Jun. 19, 2014

Related U.S. Application Data

(60) Provisional application No. 61/699,732, filed on Sep. 11, 2012, provisional application No. 61/872,630, filed on Aug. 30, 2013.

(51) Int. Cl.
*G06F 17/00* (2006.01)
*G06F 17/21* (2006.01)

(52) U.S. Cl.
CPC .................................. *G06F 17/218* (2013.01)

(58) Field of Classification Search
CPC .. G06F 17/30017; G06F 17/211; G06F 17/24; G06F 17/218; G06F 3/1454
USPC .......................................................... 715/201
See application file for complete search history.

(56) References Cited

U.S. PATENT DOCUMENTS

| | | | |
|---|---|---|---|
| 7,370,269 B1* | 5/2008 | Prabhu et al. ................ | 715/230 |
| 2003/0081000 A1* | 5/2003 | Watanabe et al. ............ | 345/751 |
| 2005/0289452 A1* | 12/2005 | Kashi et al. .................. | 715/512 |
| 2010/0058166 A1* | 3/2010 | Chikyu ................. | G06F 17/241 |
| | | | 715/230 |
| 2010/0211865 A1* | 8/2010 | Fanning et al. .............. | 715/234 |
| 2011/0154192 A1* | 6/2011 | Yang ................... | G06F 17/2288 |
| | | | 715/256 |
| 2011/0238618 A1* | 9/2011 | Valdiserri et al. ............ | 707/608 |
| 2011/0258526 A1* | 10/2011 | Supakkul et al. ............. | 715/230 |
| 2012/0030553 A1* | 2/2012 | Delpha et al. ................ | 715/205 |

* cited by examiner

*Primary Examiner* — Scott Baderman
*Assistant Examiner* — Jason Edwards

(57) ABSTRACT

A method for marking web content. The method includes rendering first content on a web browser of a client device, and capturing a snapshot of the first content as rendered according to settings of the web browser. The method also includes receiving markup in association with the snapshot, and generating marked up content comprising the snapshot and the markup. The method also includes storing the marked up content for later access.

19 Claims, 27 Drawing Sheets

METHOD AND SYSTEM FOR WEB PAGE MARKUP INCLUDING NOTES, SKETCHES, AND STAMPS

CROSS REFERENCE TO RELATED APPLICATIONS

This application claims priority to and the benefit under 35 U.S.C § 119(e) of U.S. Provisional Patent Application No. 61/699,732, filed Sep. 11, 2012, entitled "WEB PAGE MARKUP,", the disclosure of which is hereby incorporated by reference in its entirety. This application also claims priority to and the benefit under 35 U.S.C § 119(e) of U.S. Provisional Patent Application No. 61/872,630, filed Aug. 30, 2013, entitled "METHOD AND SYSTEM FOR CO-BROWSING,", the disclosure of which is hereby incorporated by reference in its entirety.

BACKGROUND

Throughout time, information was most commonly printed on, published and disseminated via paper based media, such as paper, newspapers, magazines, flyers, postcards, letters, etc. That information would then be disseminated for public consumption. In a typical example, a flyer could be produced containing information relating to a band performance at the local civic auditorium. As the flyer announcing the concert date gets handed around by promoters, eventually one particular flyer would reach an interested party, a fan. That fan could then try to get additional friends to attend the band concert using the same flyer by writing a hand written note on the flyer expressing enthusiasm for attending the concert and passing that note to a friend. That is, the flyer would be marked up with personal information and then passed along.

More particularly, using a paper based media platforms, it was a simple matter for a reader to add notes by hand to that piece of paper using any marking implement (e.g., pen, pencil, etc.). Those notes could express the writer's opinions, desires, reflections, appreciations, etc. Importantly, the piece of paper conveyed two pieces of information, including underlying concert information, and a personal note expressing interest in attending the concert.

Taking the simple action of writing a note on a flyer, personal information relating to two or more individuals could be expressed and passed between those individuals. That is, the hand written note could then be shared with others (e.g., family members, friends, colleagues, etc.) by handing that marked-up paper to the intended recipient.

Fast forward to today's multi-media information market, where content publication is distributed through many electronic platforms. For instance, information could be distributed through web-server means (e.g., through the internet), or through other communication networks (e.g., through smartphones). A user would view that information through some electronic display (e.g., computer, smartphone, etc.).

However, with modern distribution of information through electronic media, a user's ability to add personal information to that electronic content is difficult. For instance, projecting personal expressions of a viewer about a piece of content without reverting back to traditional methods is cumbersome. While basic, the traditional method (e.g., including printing out a piece of content, adding personal written information to that printed content, and then passing it to a friend) is limited in application, as it takes time to distribute, cannot be easily extended beyond some limited physical range without involving elaborate distribution methods (e.g., postal mail), and is directed to a single individual.

In another application that reaches more towards modern technology, a user may copy a link to the electronic content and put it into an email, wherein the email contains a personal message relating to the content. This approach however still does not reach far enough, as the personal note is disassociated with the underlying web content. That is, the personal note is contained in the email, which is displayed separately from the underlying web content.

It would be beneficial to provide direct markup of electronic content and sharing of that marked up content with others.

SUMMARY

A computer implemented method for marking is described in accordance with one embodiment of the invention. The method includes rendering first content on a web browser of a client device. The method further includes capturing a snapshot of the first content as rendered according to settings of the web browser. The method further includes receiving markup in association with the snapshot, and generating marked up content that comprises the snapshot and the markup. The method further includes storing the marked up content for later access.

In other embodiments of the present invention, a non-transitory computer-readable medium is disclosed having computer-executable instructions for causing a computer system to perform a method for marking. The method includes rendering first content on a web browser of a client device. The method further includes capturing a snapshot of the first content as rendered according to settings of the web browser. The method further includes receiving markup in association with the snapshot, and generating marked up content that comprises the snapshot and the markup. The method further includes storing the marked up content for later access.

In other embodiments, a system for marking is disclosed. The system includes a web browser configured for rendering first content. The web browser or other capture module is configurable to capture a snapshot of the first content as rendered according to settings of the web browser. The system also includes a markup interface as implemented through the web browser, wherein the markup interface is configured for generating markup in association with the snapshot, such that marked up content comprising said snapshot and said markup is generated.

In still other embodiments, another system for marking is disclosed. The system includes a snapshot of first content rendered by a web browser of a client device. The system also includes a markup overlaid the snapshot. The system also includes marked up content comprising the snapshot and the markup, wherein the marked up content is configured for storage by a back end server for later access and rendering by any suitable web browser.

BRIEF DESCRIPTION

The accompanying drawings, which are incorporated in and form a part of this specification and in which like numerals depict like elements, illustrate embodiments of the present disclosure and, together with the description, serve to explain the principles of the disclosure.

Figure 6A:
Figure 6B:
Figure 6C:
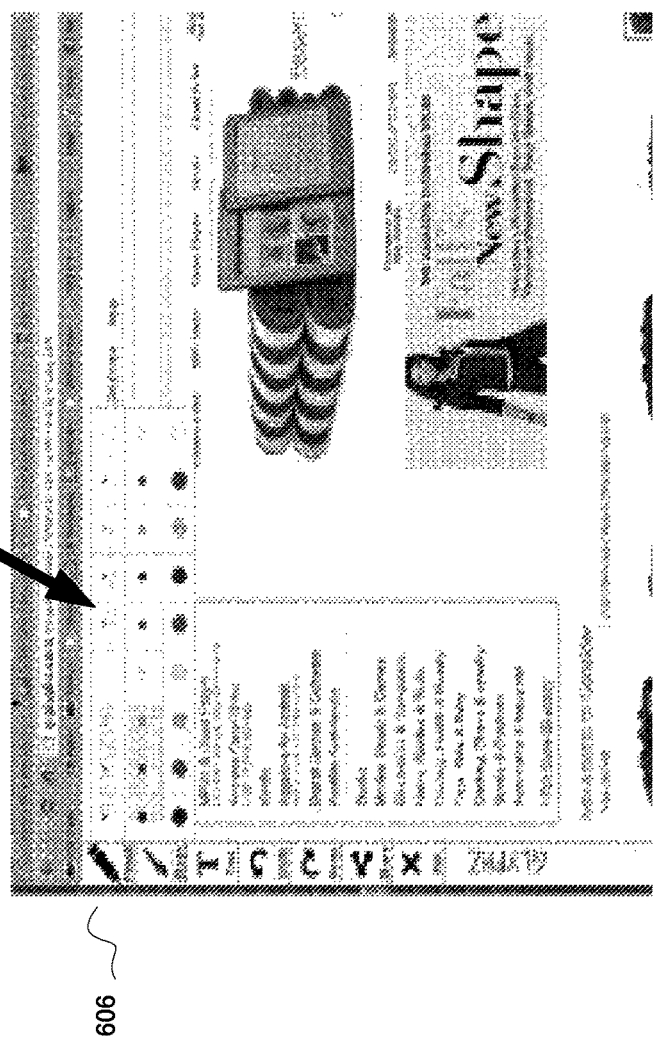
Figure 6D:
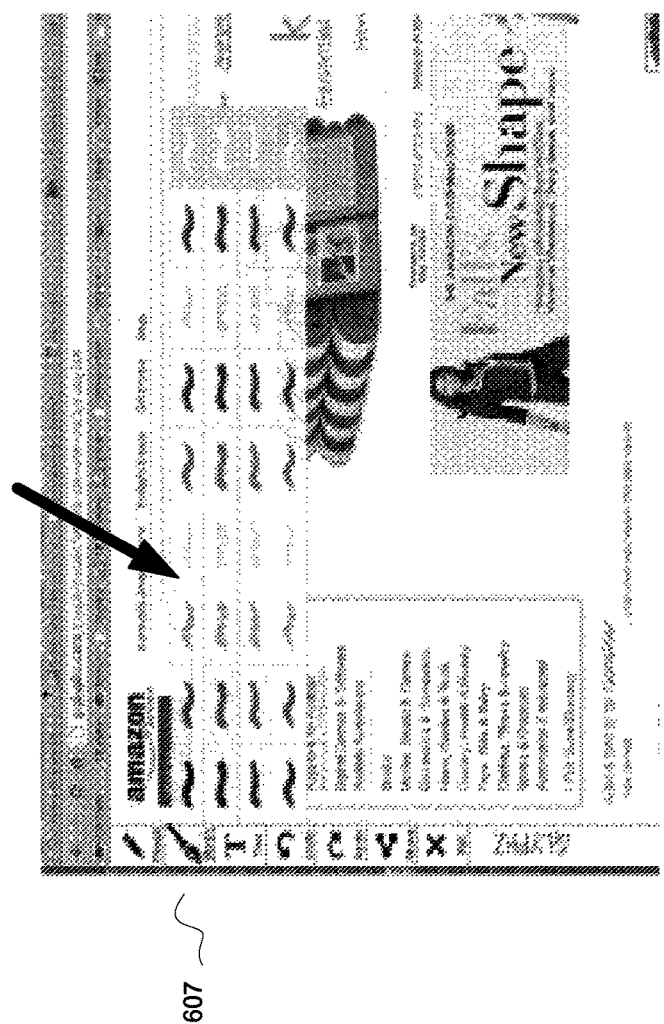
Figure 6E:
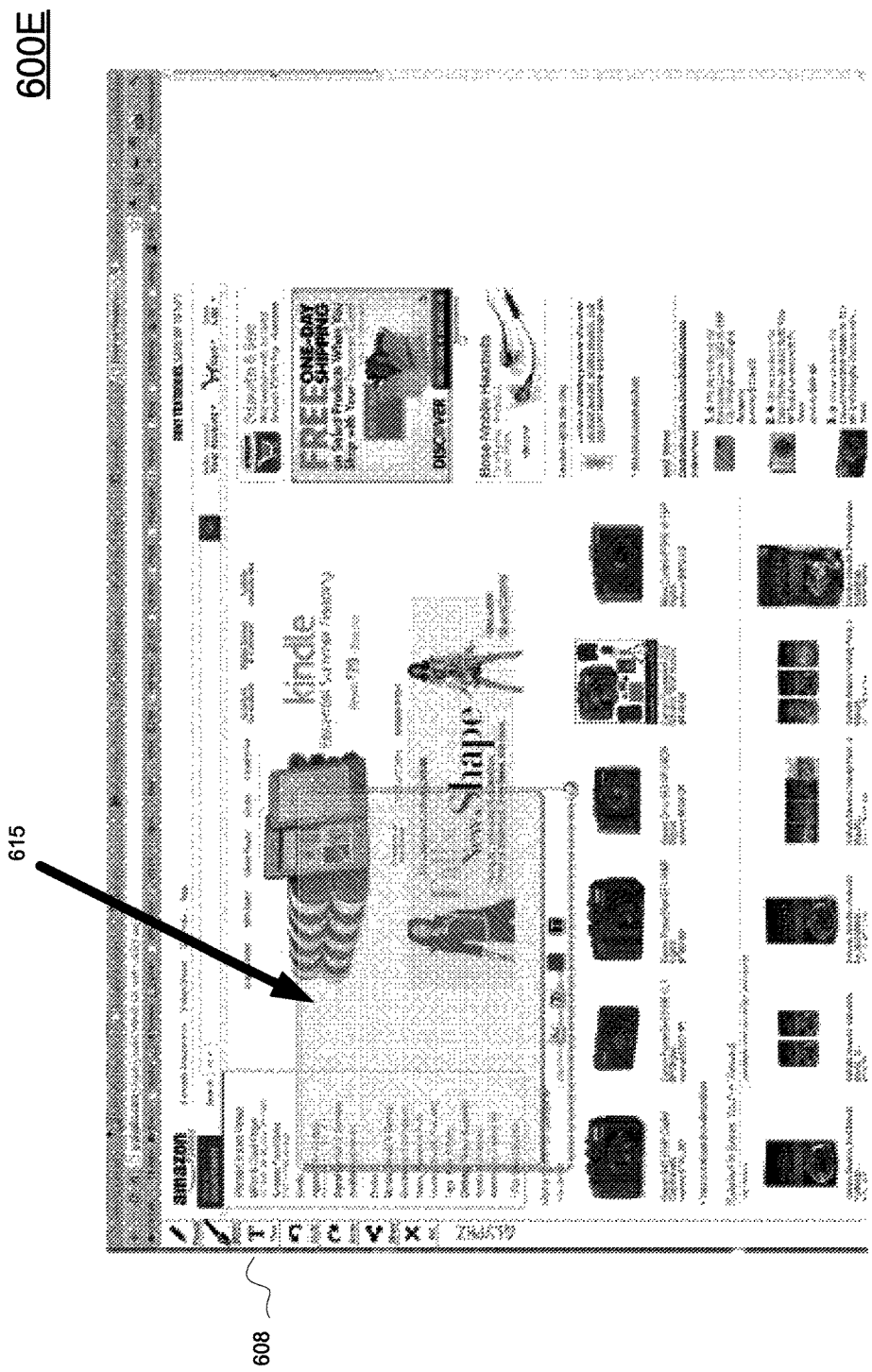
Figure 6F:
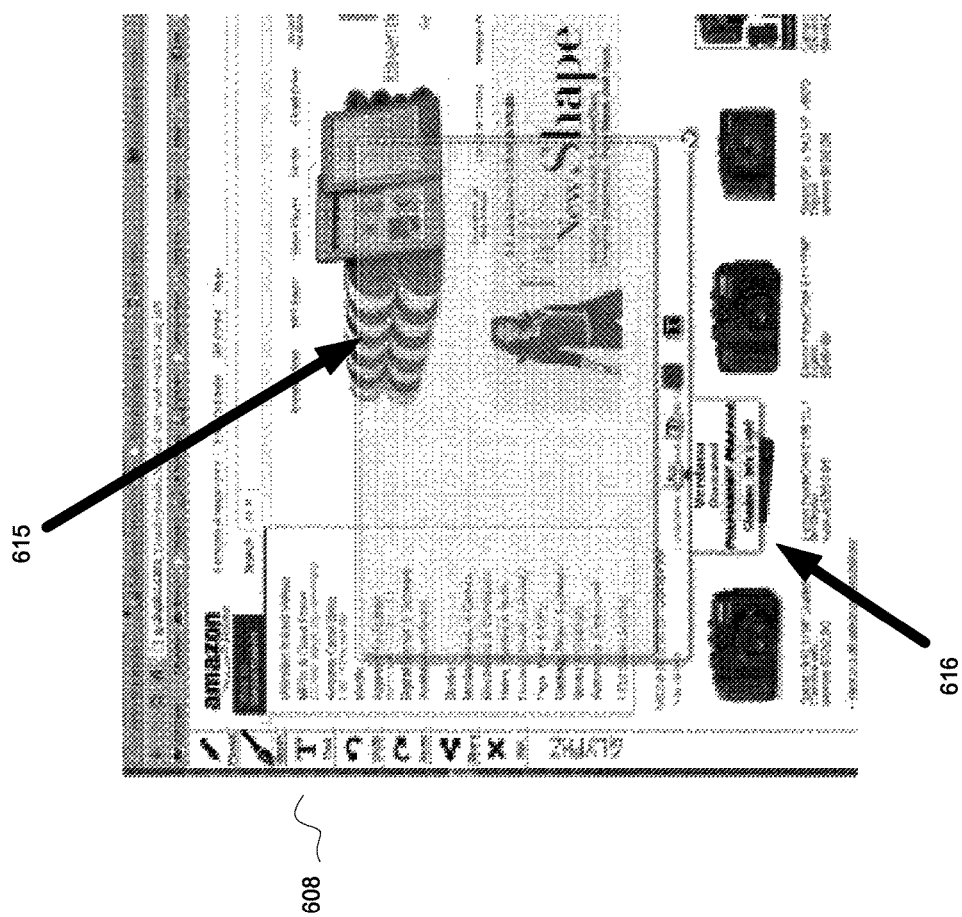
Figure 6G:
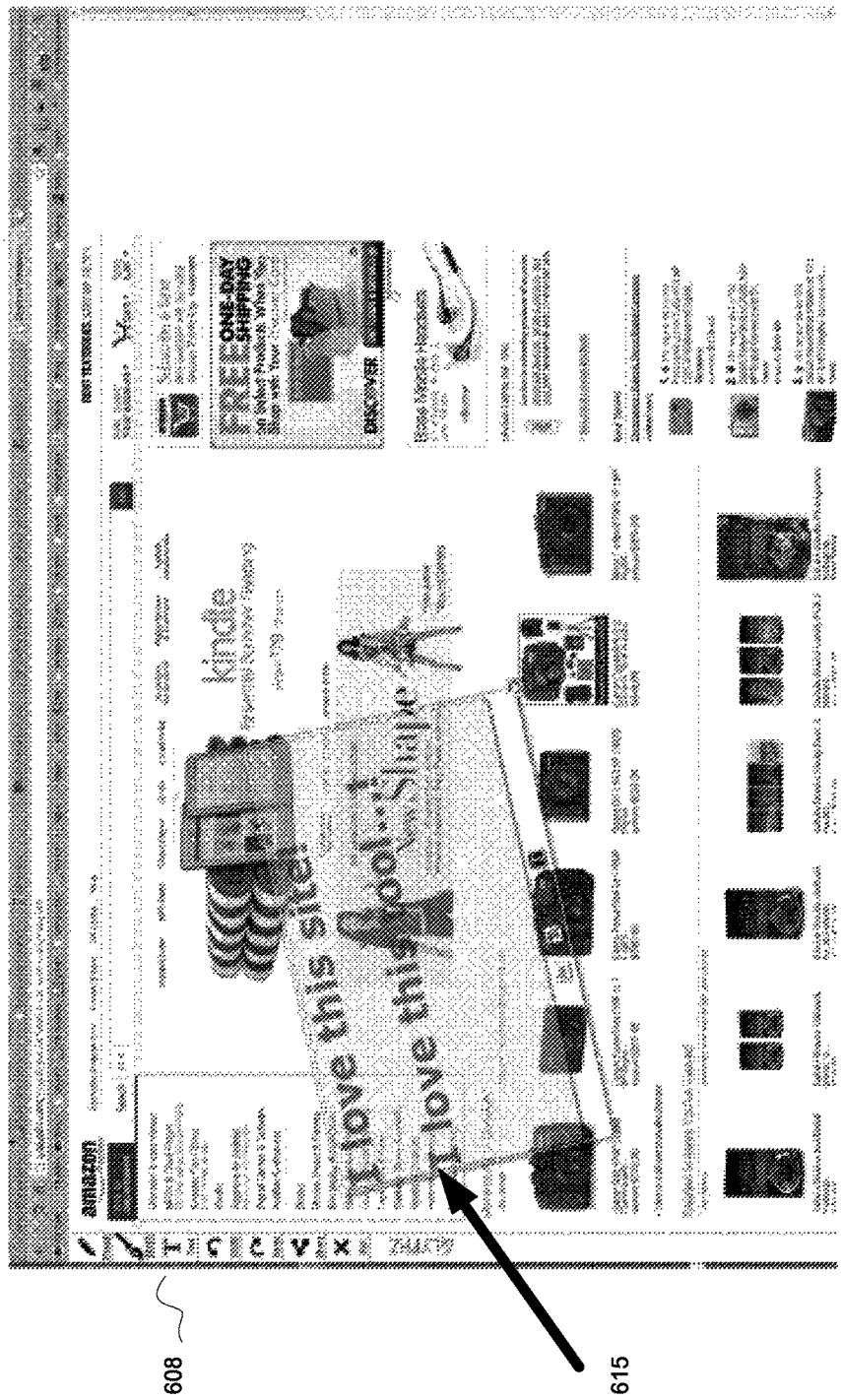
Figure 6H:
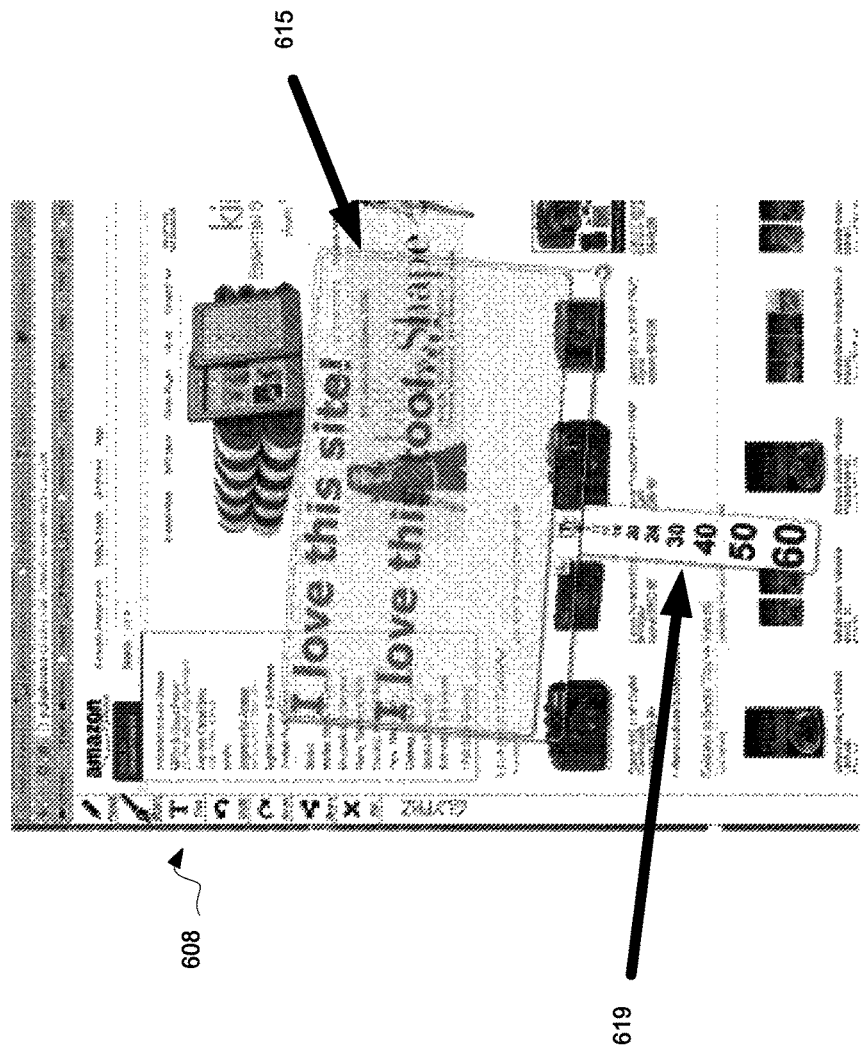
Figure 6I:
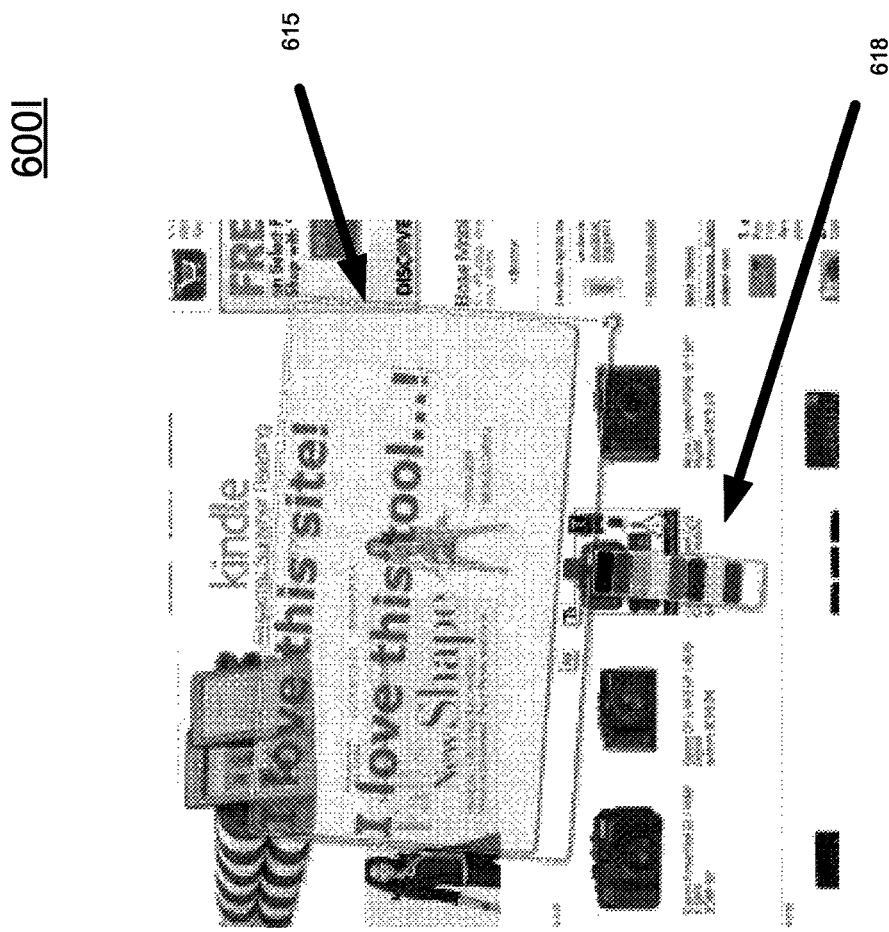
Figure 6J:
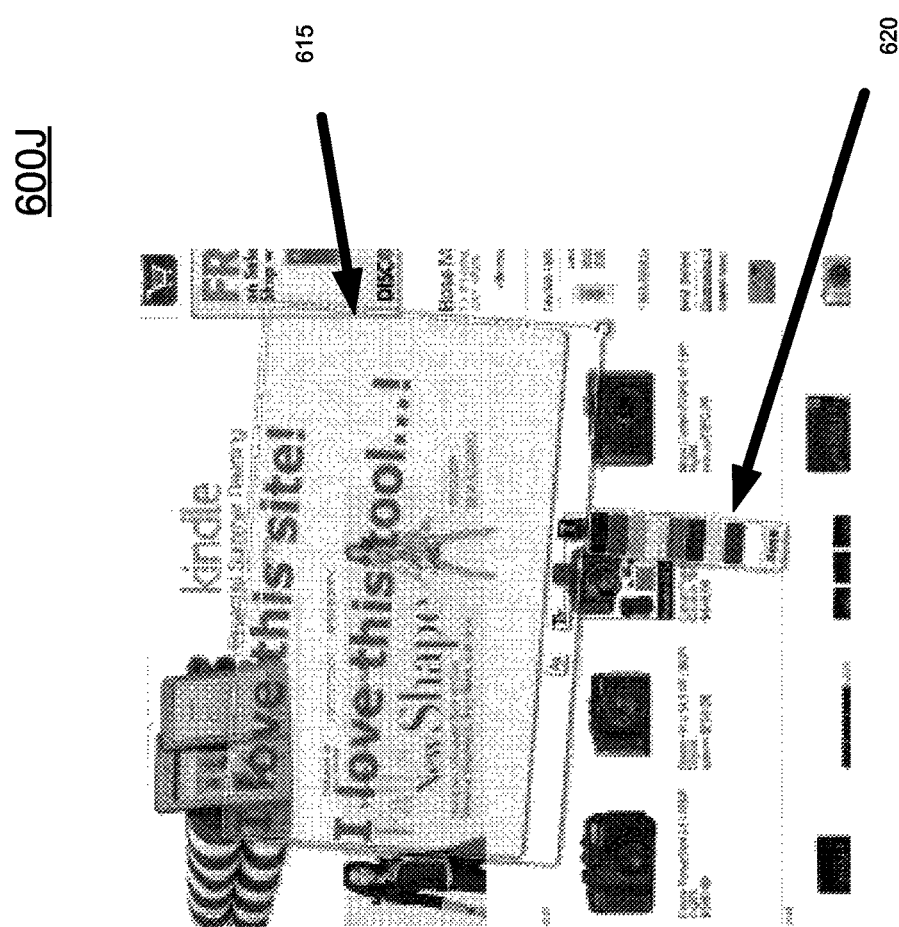
Figure 6K:
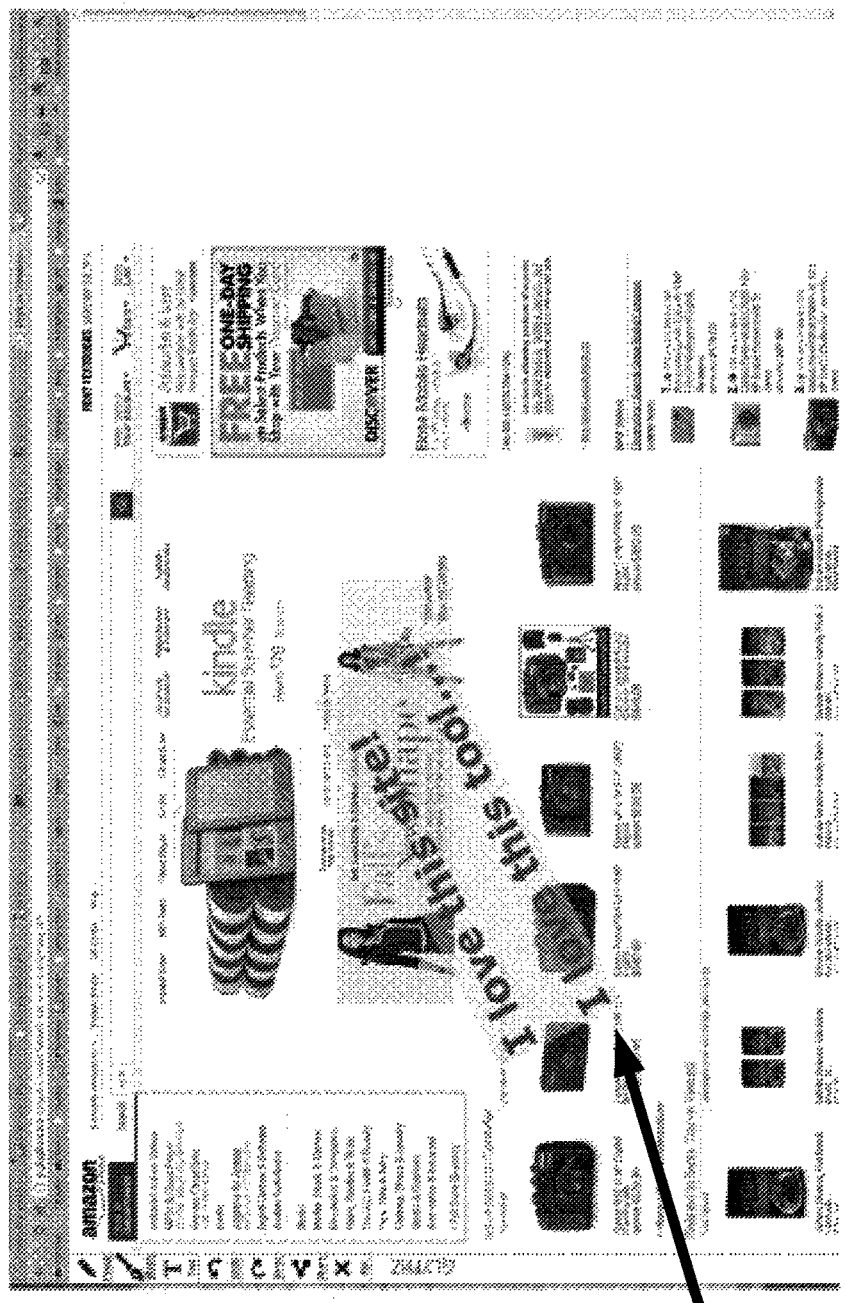
Figure 6L:
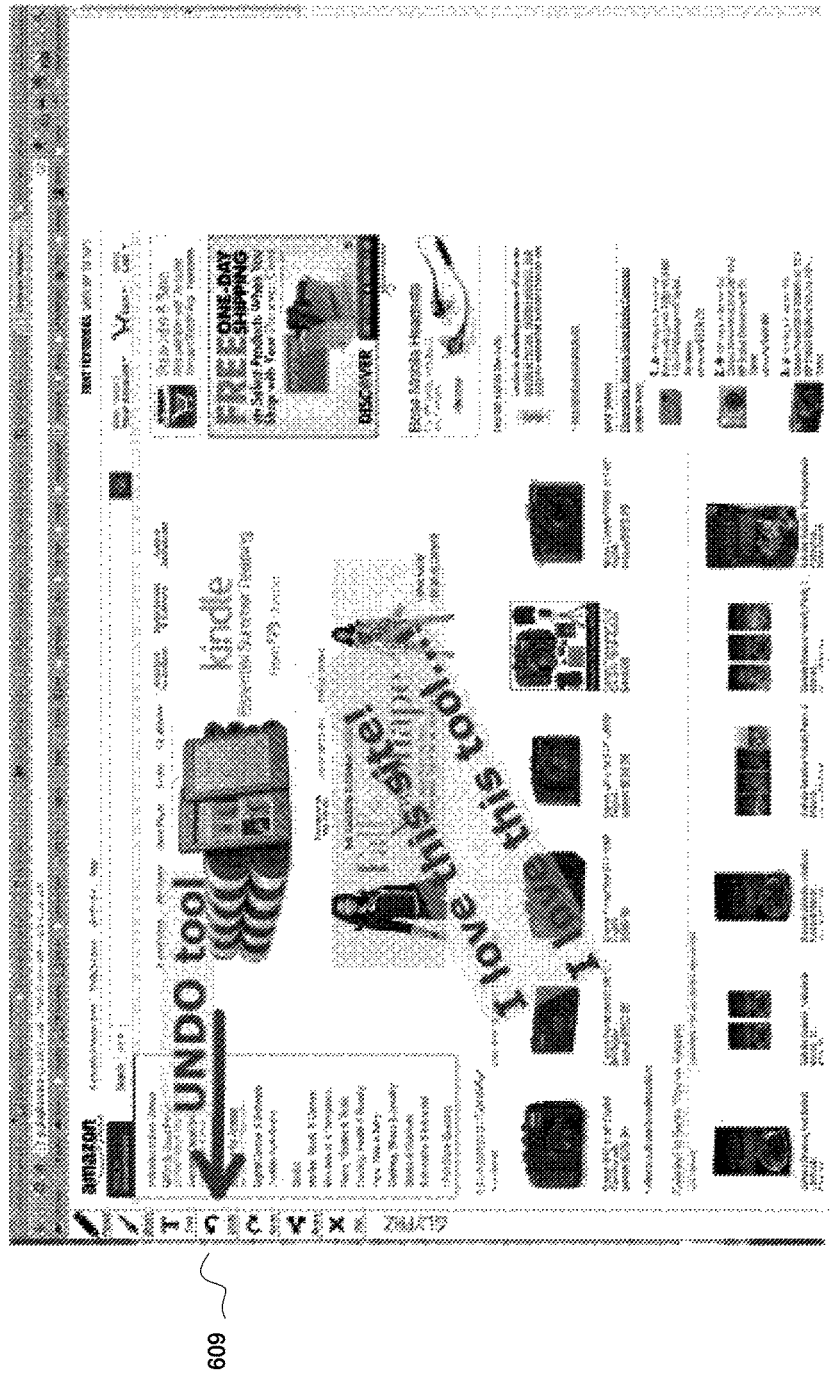
Figure 6M:
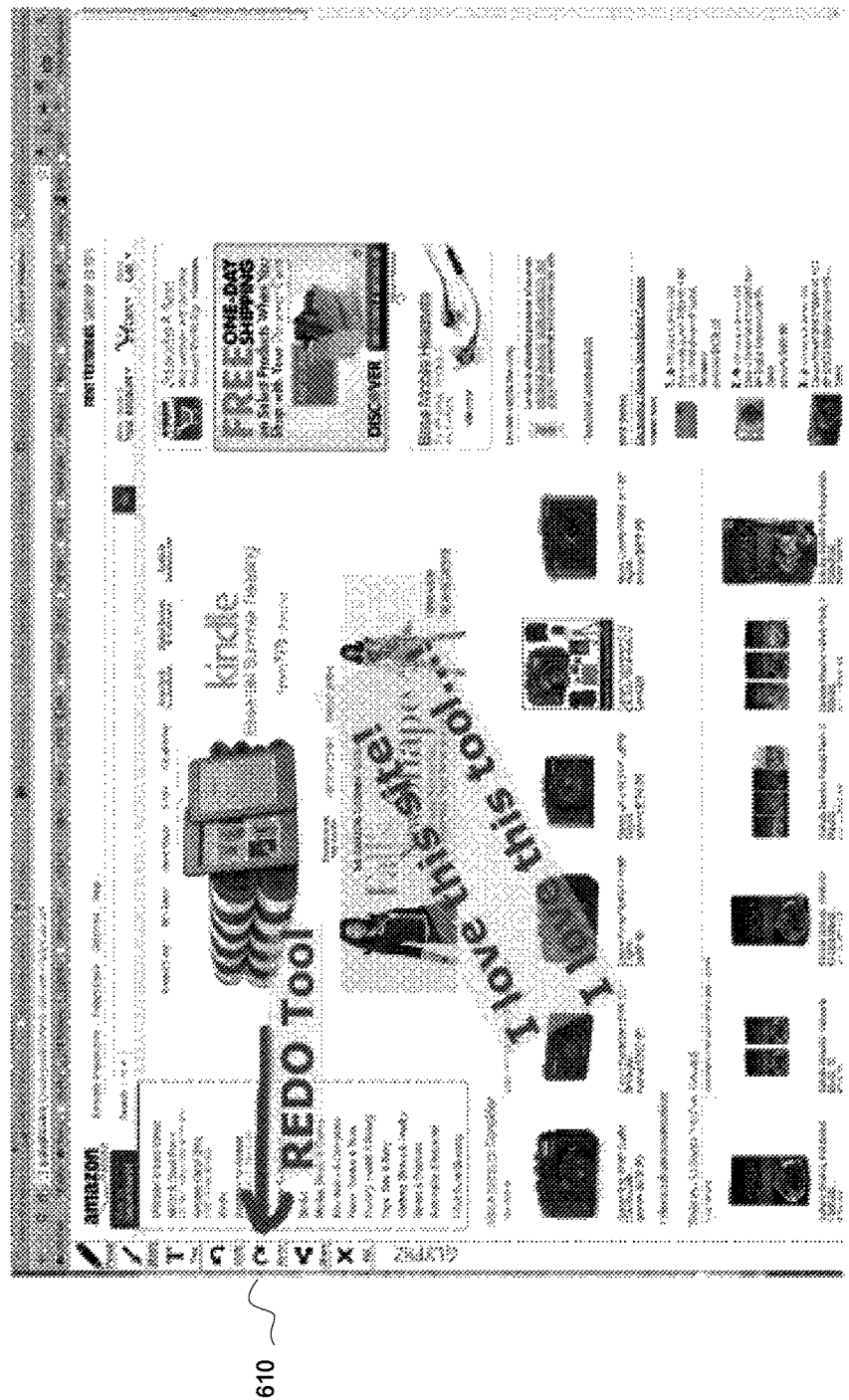
Figure 6N:
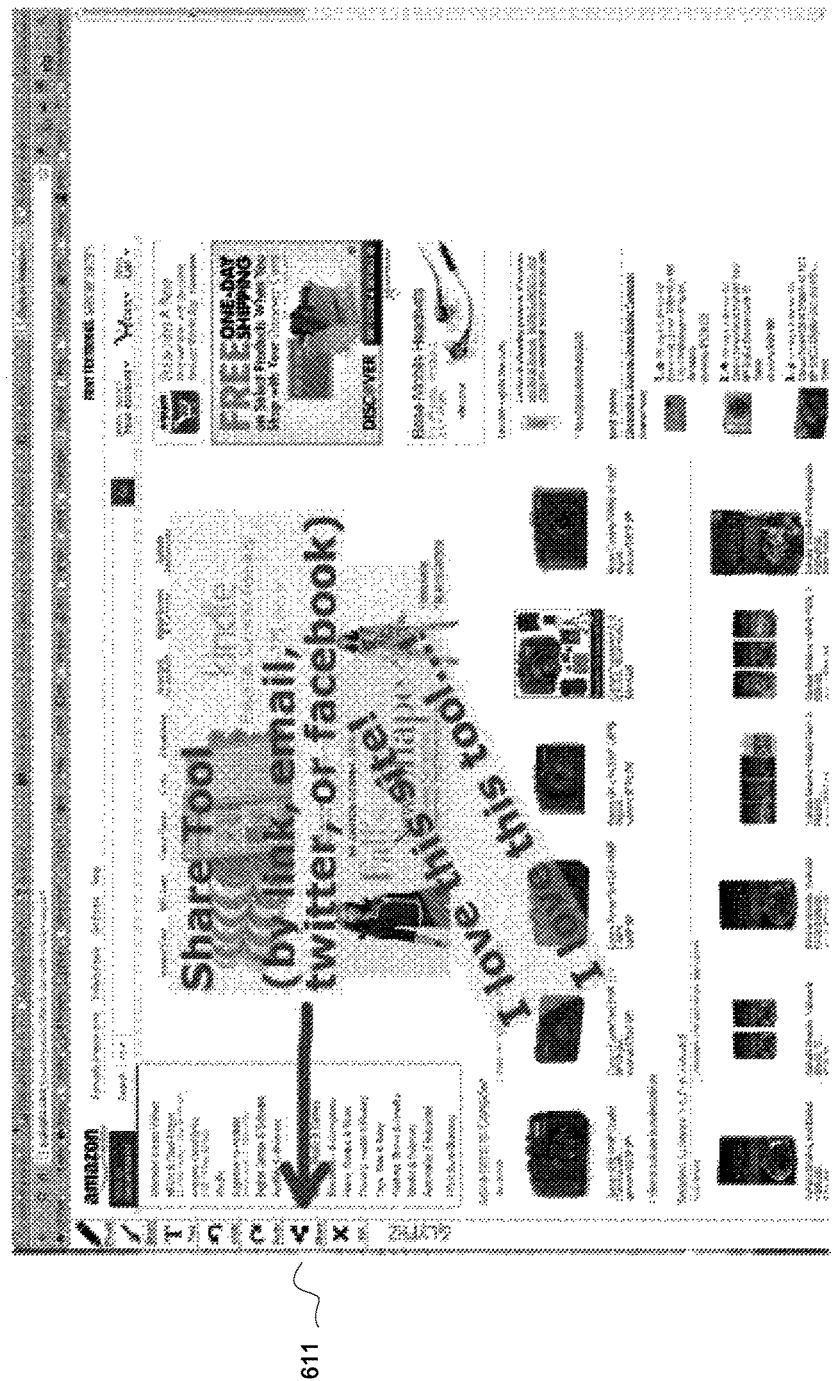

FIGS. 6A-N are illustrations of web content and a marking interface used to make markings on the web content, in accordance with embodiments of the present disclosure.

FIGS. 7A-7F are example markings of representative web contents in various use cases, in accordance with embodiments of the present invention.

DETAILED DESCRIPTION

Reference will now be made in detail to the various embodiments of the present disclosure, examples of which are illustrated in the accompanying drawings. While described in conjunction with these embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those utilizing physical manipulations of physical quantities. Usually, although not necessarily, these quantities take the form of electrical or magnetic signals capable of being stored, transferred, combined, compared, and otherwise manipulated in a computer system. It has proven convenient at times, principally for reasons of common usage, to refer to these signals as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "marking," "rendering," "capturing," "receiving," "generating," "storing," "browsing," "co-browsing," or the like, refer to actions and processes of a computer system or similar electronic computing device or processor (e.g., system 100). The computer system or similar electronic computing device manipulates and transforms data represented as physical (electronic) quantities within the computer system memories, registers or other such information storage, transmission or display devices.

Other embodiments described herein may be discussed in the general context of computer-executable instructions residing on some form of computer-readable storage medium, such as program modules, executed by one or more computers or other devices. By way of example, and not limitation, computer-readable storage media may comprise non-transitory computer storage media and communication media. Generally, program modules include routines, programs, objects, components, data structures, etc., that perform particular tasks or implement particular abstract data types. The functionality of the program modules may be combined or distributed as desired in various embodiments.

Computer storage media includes volatile and nonvolatile, removable and non-removable media implemented in any method or technology for storage of information such as computer-readable instructions, data structures, program modules or other data. Computer storage media includes, but is not limited to, random access memory (RAM), read only memory (ROM), electrically erasable programmable ROM (EEPROM), flash memory or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information and that can accessed to retrieve that information.

Communication media can embody computer-executable instructions, data structures, and program modules, and includes any information delivery media. By way of example, and not limitation, communication media includes wired media such as a wired network or direct-wired connection, and wireless media such as acoustic, radio frequency (RF), infrared and other wireless media. Combinations of any of the above can also be included within the scope of computer-readable media.

Figure 1:
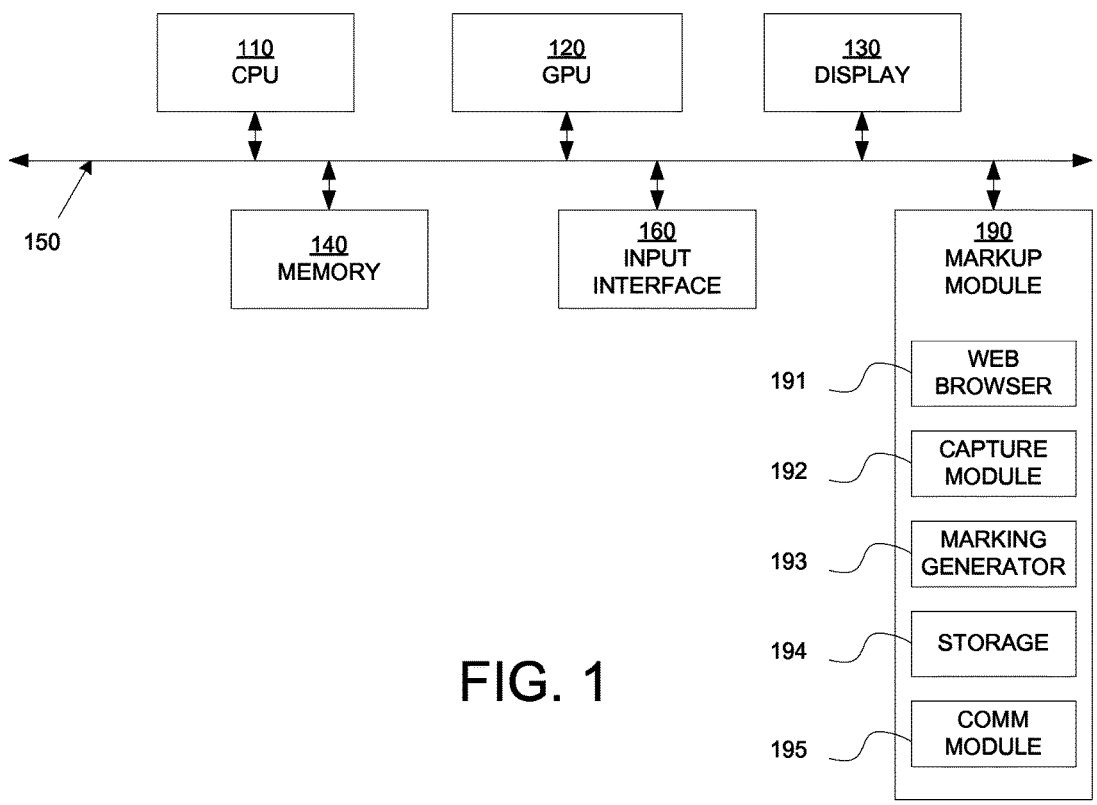
FIG. 1 depicts a block diagram of an exemplary computer system suitable for implementing the present methods, in accordance with one embodiment of the present disclosure.

FIG. 1 is a block diagram of an example of a computing system 100 capable of implementing embodiments of the present disclosure. Computing system 100 broadly represents any single or multi-processor computing device or system capable of executing computer-readable instructions. Examples of computing system 100 include, without limitation, workstations, laptops, client-side terminals, servers, distributed computing systems, handheld devices, or any other computing system or device. In its most basic configuration, computing system 100 may include at least one processor 110 and a system memory 140.

Both the central processing unit (CPU) 110 and the graphics processing unit (GPU) 120 are coupled to memory 140. System memory 140 generally represents any type or form of volatile or non-volatile storage device or medium capable of storing data and/or other computer-readable instructions. Examples of system memory 140 include, without limitation, RAM, ROM, flash memory, or any other suitable memory device. In the example of FIG. 1, memory 140 is a shared memory, whereby the memory stores instructions and data for both the CPU 110 and the GPU 120. Alternatively, there may be separate memories dedicated to the CPU 110 and the GPU 120, respectively. The memory can include a frame buffer for storing pixel data that drives a display screen 130.

The system 100 includes a user interface 160 that, in one implementation, includes an on-screen cursor control device. The user interface may include a keyboard, a mouse, and/or a touch screen device (a touchpad).

The system 100 also includes a markup module 190 that is configured for enabling marking of any content suitable for display through a web browser. For instance, the markup module 190 includes a web browser 191 for rendering content, and for providing a platform for generating markup. The markup module 190 also includes a capture module 192 configured for capturing a snapshot of the content that is suitable for marking. Module 190 also includes a marking generator 193 configured for enabling marking (e.g., markup) of the content, and for generating marked up content that includes the snapshot and the markup. Markup module 190 also includes storage 194 for storing the marked up content, and a communication module 195 for delivering the marked up content at a back end server. In one embodiment, markup module 190 includes one or more of the illustrated components and is implemented at a client device. In another embodiment, markup module 190 includes one or more the illustrated components and is implemented at a back end server configured for enabling marking of web content through a web browser at a client device.

CPU 110 and/or GPU 120 generally represent any type or form of processing unit capable of processing data or interpreting and executing instructions. In certain embodiments, processors 110 and/or 120 may receive instructions from a software application or hardware module. These instructions may cause processors 110 and/or 120 to perform the functions of one or more of the example embodiments described and/or illustrated herein. For example, processors 110 and/or 120 may perform and/or be a means for performing, either alone or in combination with other elements, one or more of the monitoring, determining, gating, and detecting, or the like described herein. Processors 110 and/or 120 may also perform and/or be a means for performing any other steps, methods, or processes described and/or illustrated herein.

In some embodiments, the computer-readable medium containing a computer program may be loaded into computing system 100. All or a portion of the computer program stored on the computer-readable medium may then be stored in system memory 140 and/or various portions of storage devices. When executed by processors 110 and/or 120, a computer program loaded into computing system 100 may cause processor 110 and/or 120 to perform and/or be a means for performing the functions of the example embodiments described and/or illustrated herein. Additionally or alternatively, the example embodiments described and/or illustrated herein may be implemented in firmware and/or hardware.

Throughout this application, certain terms are used for describing the marking of content. For instance, the term "annotation" is intended to include a gesture-initiated mark, typed text, or applied stencil/stamp that is user-enacted, and not previously a component of the published web page from the web site author or administrator. The term "web browser" is intended to describe a software application that allows content addressed via a URL to be displayed via HTTP, HTTPS, and hypertext markup language (HTML) protocols. The term "modern web browser" is intended to describe web browsers that are JavaScript and HTML5 enabled. Examples currently include most recent versions of Firefox, Chrome, Chromium, Safari, and Opera. It is likely others (e.g., Internet Explorer) will soon become such as well. The term "mouse" is intended to describe a pointing device used to provide input to a computer in order to indicate a user's selection, wherein that selection then influences the execution of computer software. The term "click" is intended to describe an action performed by a computer user that sends an associated signal to the computer that a CLICK ACTION (e.g., depressing a button on a mouse) was performed by the user.

Web Page Markup

Accordingly, embodiments of the present invention provide for a method whereby a user may make random annotations to any content (e.g., web page accessed through any uniform resource locator, "URL"), from any publisher, using a web browser (e.g., one that is JavaScript-enabled). Other embodiments provide the above accomplishments and further provide for the sharing of marked up content with any other network based (e.g., telecommunications, internet) user that is also browser-enabled. Embodiments of the invention provide the above accomplishments and further provide for enabling marking of web content and the sharing of that web content through a web shortcut (e.g., bookmarklet) installed on a web browser of a client device, wherein the shortcut contains commands that extend the browser's functionality, and may be imported from a back end markup server. Still other embodiments of the present invention provide the above accomplishments and further provide for enabling marking of web content and the sharing of that web content through a native application that extends the functionality of a web browser of a client device.

Figure 2:
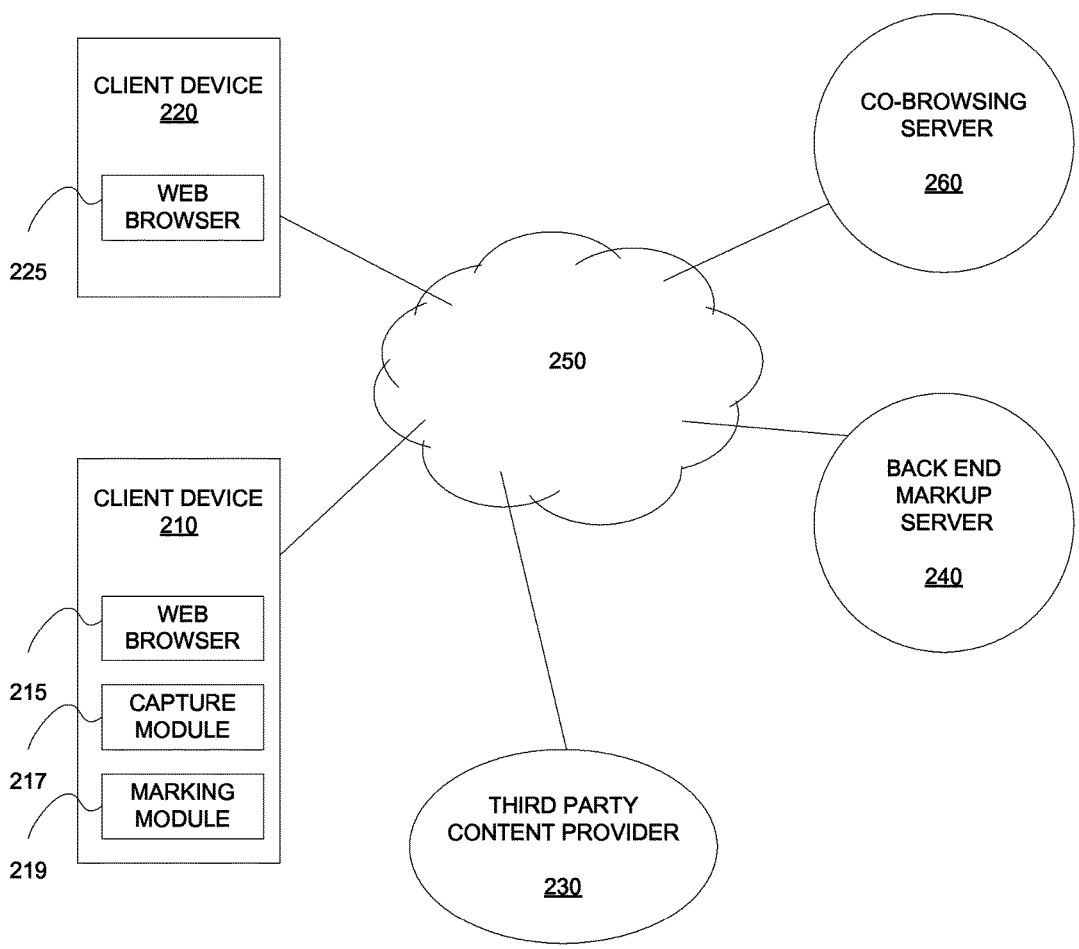
FIG. 2 is an illustration of a system capable of performing marking or annotations to any web content through a web browser implementation, in accordance with one embodiment of the invention.

FIG. 2 is an illustration of a system 200 capable of performing marking or annotations to any web content through a web browser implementation, in accordance with one embodiment of the invention. As shown, system 200 includes one or more client devices, such as client device 210 and client device 220. Each of the client devices are configured with a corresponding web browser for rendering web content. For instance, client device 210 includes web browser 215 and client device 220 includes web browser 225. More particularly, the web browsers 215 and 225 are each configured to access online content (including code, images, video, or other content related to a web page or otherwise accessed through the internet) from the third party web provider 230. Access is accomplished through some communication network 250.

In addition, the web browsers are each configured to facilitate and/or enable marking of rendered content, or any content that is renderable by a web browser. In one implementation, the content comprises html formatted content that is renderable by any suitable web browser, and wherein marking of the html content is possible through embodiments of the present invention. In another implementation, the content comprises image formatted content that is renderable by any suitable web browser, and wherein marking of the image content is possible through embodiments of the present invention.

For example, client device 210 is shown as representative of any client device capable of marking content. In particular, client device 210 includes a capture module 217 that is configured for capturing a snapshot of the first content that is rendered by the web browser 210. The snapshot is captured according the display settings of the web browser 210.

Additionally, client device 210 includes a marking module (markup interface) 219 that is configured to generate markup in association with the snapshot. In one embodiment, the markup interface 219 is implemented through the web browser 225. For example, in one embodiment, the markup interface 219 is implemented as a web bookmarklet that provides a shortcut to extended functionality enabled in a web browser. The extended functionality may have been provided by a back end markup server 240, in one embodiment. In another implementation, the markup interface 219 is implemented as a native application, or extension to the web browser (e.g., add-on, plug-in etc.). In other embodiments, the markup is generated in a separate layer that is overlaid on the snapshot. In other embodiments, the markup is generated within the snapshot. The markup interface 219 is configured to generate marked up content that includes the markup and the snapshot.

The markup includes any user generated content or information that is generated in association with the first content. For instance, the markup includes various styles to include notes, sketches, and stamps. The notes include keyboard inputted textual information that is attached to a specific location on a page of web content. Sketches include freehand drawing markup or note taking (e.g., written information), such as, those done with a writing instrument (e.g., electronic pen or electronic brush). Stamps include arbitrary images that are superimposed on web content, such as, in relation to anchor points of an anchored object. These stamps may be selected from a stamp gallery containing preconfigured and/or customized sets of images used as stamps. For instance, a preconfigured image include the following as illustrations, such as, a "happy face," emoticon, a thumbs up, thumbs down, and a face with its tongue hanging indicating displeasure. The markup includes other types or formats of information, to include video, audio, animation, graphics interchange formatting (GIF), graphics, images, and any other type of electronic media formatting.

In one embodiment, client device 210 and client device 220 are participating in a co-browsing session. In particular, co-browsing server 260 is configured to facilitate co-browsing of web content by both the client device 210 and client device 220, simultaneously through network 250. For example, co-browsing of online content is enabled between the web browsers for both client devices 210 and 220. Co-browsing may be implemented through various architectures. For instance, a co-browsing session may be established between a web browser running on a computer system associated with a first customer using client device 210, and a web browser running on a computer system associated with a second customer associated with client device 220. The co-browsing session allows the two browsers to display the same online content (e.g., an html web page). For instance, a customer-to-customer (C2C) architecture provides for co-browsing of online content between a first customer and a second customer with only one customer computer having an extension implementing co-browsing. A business-to-customer (B2C) architecture provides for co-browsing of online content hosted by a web site between a customer and an agent of the web site, wherein the online content contains a link for implementing co-browsing, and wherein none of the customer computers need an extension for implementing co-browsing. Further, a business-to-customer-to-customer (B2C2C) architecture provides for co-browsing of online content hosted by a web site between a first customer and a second customer, wherein the online content contains a link for implementing co-browsing, and wherein none of the customer computers need an extension application for implementing co-browsing.

System 200 also includes a back end markup server 240 configured for enabling marking of content as implemented through a remote web server, and for storing marked up content for later access. In one embodiment, back end server 240 is configured to enable marking of web content through web browsers located on remote client devices. That is, the web browser works in conjunction with the back end markup server 240 to generate marking (e.g., markup) of overlaid content, and for storing that marked up content on the back end markup server 240. For instance, in one embodiment, an application configured for marking (e.g., JavaScript) may be downloaded from the back end markup server 240 through a bookmarklet, or by selecting the bookmarklet, via the client side web browser.

System 200 also includes a communication network 250 to facilitate communication between the client devices, back-end markup server 240, co-browsing server 260, and the third party web provider 230. For instance, network 250 provides internet connectivity between two or more devices. Also, network 250 provides telecommunications connectivity between two or more devices. Further, network 250 provides a combination of internet and telecommunication connectivity between two or more devices.

Figure 3A:
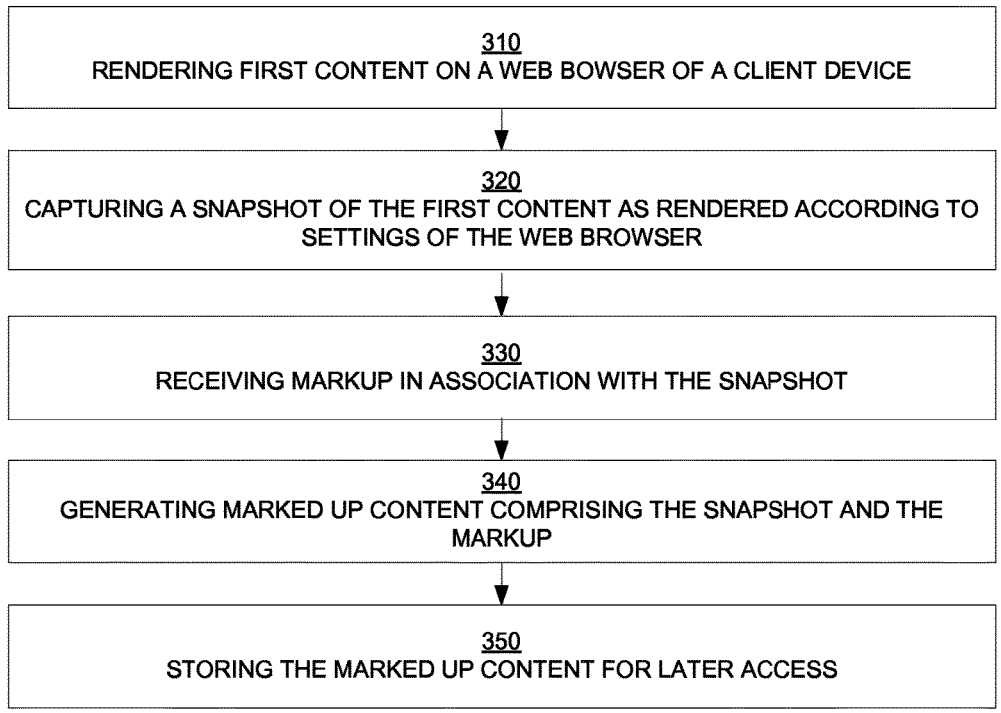
FIG. 3A is a flow diagram illustrating a method of marking web content through a web browser implementation, in accordance with one embodiment of the invention.

FIG. 3A is a flow diagram 300A illustrating a method and/or a computer-implemented method for capturing marking up content as implemented through web browser functionality, in accordance with one embodiment of the invention. In another embodiment, flow diagram 300 is implemented within a computer system including a processor and memory coupled to the processor and having stored therein instructions that, if executed by the computer system causes the system to execute a method for capturing marking up content as implemented through web browser functionality. In still another embodiment, instructions for performing a method are stored on a non-transitory computer-readable storage medium having computer-executable instructions for causing a computer system to perform a method for capturing marking up content as implemented through web browser functionality. The method outlined in flow diagram 300 is implementable by one or more components of the computer system 100 and system 200 of FIGS. 1 and 2, respectively.

At 310, the method includes rendering first content on a web browser of a client device. For instance, the first content may be provided by a third party content provider through a communication network (e.g., internet). In another implementation, the first content is any content that is renderable by any suitable web browser. For instance, the first content includes files that are converted into html formatted content or image formatted content. For instance, a file of a first format (e.g., pdf) is received, wherein the file is translated into a second format (e.g., html or image), that is renderable by any suitable web browser. That rendered, first content is configured for marking using embodiments of the present invention, and the marked up content is sharable with other users through corresponding web browsers.

At 320, the method includes optionally capturing a snapshot of the first content as rendered according to settings of the web browser that is rending the first content. That is, the snapshot captures the rendering dimensions of every element on the page. For instance, the html content is captured as a snapshot so that the first content is renderable by any suitable web browser at a later time. In addition, the settings of the web browser are also captured, so that the portions of the first content are also renderable using the captured settings. This is important when rendering markup that is anchored to an object, as will be described more fully below.

At 330, the method includes receiving markup in association with the snapshot. For instance, marking functionality is implemented through a web browser on a client device of a user generating the markup, in one embodiment. In other embodiments, the marking functionality is provided through a web browser, and as enabled through a back end markup server (e.g., serer 240), such as, through a marking function call (e.g., JavaScript) enabled by a bookmarklet. In still other embodiments, the marking functionality is provided through web extensions to a web browser, or through a native application installed on or in conjunction with the web browser.

In one embodiment, the marking functionality includes a free-hand feature that simulates note taking using an electronic writing instrument (e.g., pen, brush, etc.). In another embodiment, the marking functionality includes a note taking feature, that provides for text to be included within a note window, wherein the text is entered through electronic keyboard. In still another embodiment, the marking functionality includes a stamp feature, that provides for stamps or images to be inserted as markup. Still other formats are available for marking, wherein annotations or marking includes data, such as video, audio, GIF, graphics, etc.

At 340, the method includes generating marked up content that comprises the snapshot and the markup. That is, the first content is now marked up as represented by the marked up content. For instance, the markup is rendered in relation to the snapshot of the first content. In one implementation, the markup is rendered in relation to the snapshot according to the originally captured settings. As such, the snapshot locks the dimensions of every element on a page of the first content, as rendered by the web browser. Further, the markup is also locked to the snapshot, or rather the dimensions of every element on the page (e.g., the markup is overlaid the snapshot). This marked up content is included within one package, and is reproducible by any suitable web browser.

At 350, the method includes storing the marked up content for later access. In one embodiment, the marked up content is stored in a back end markup server. The marked up content is provided as a single package (e.g., a snapshot). For instance, the marked up content is associated with a URL pointing to an address location in the back end markup server that contains the marked up content. In that manner, a link containing the URL can be activated so that any suitable web browser may access the marked up content. In another embodiment, the marked up content is stored locally in the client device for later access, and distribution.

In one embodiment, the method includes embedding a link to a home page of the third party content provider providing the first content into the marked up content. In that manner, when a user is accessing the marked up content through a web browser, immediate access to the home page is enabled, wherein activation of the link through any suitable web browser redirects the web browser to the home page. For example, when shopping for a product, the marked up content may include comments made by one or more associated and sharing parties. Any party accessing the marked up content may wish to then purchase the product, and may do so by going to the home page of the third party content provider by clicking on the link. In one embodiment, by clicking the embedded link, a marked up content is displayed to two or more browsers that are participating in a co-browsing session. As such, the parties are able to go to the home page of the third party content provider (e.g., web site) providing the first content.

Furthermore, the marked up content, as rendered, may be associated with additional markings. That is, the marked up content, as rendered, is capable of being captured as a second snapshot, with additional markings overlaid the second snapshot. In particular, the method includes rendering the marked up web content on a second web browser. The marked up web content is accessed through a back end markup web server that stores the marked up web content. The method includes capturing a second snapshot of the marked up web content, as rendered, according to second settings of the second web browser. The method includes receiving second markup in association with the second snapshot. The method includes generating second marked up web content comprising the second snapshot and the second markup, which is then stored for later access.

Figure 3B:
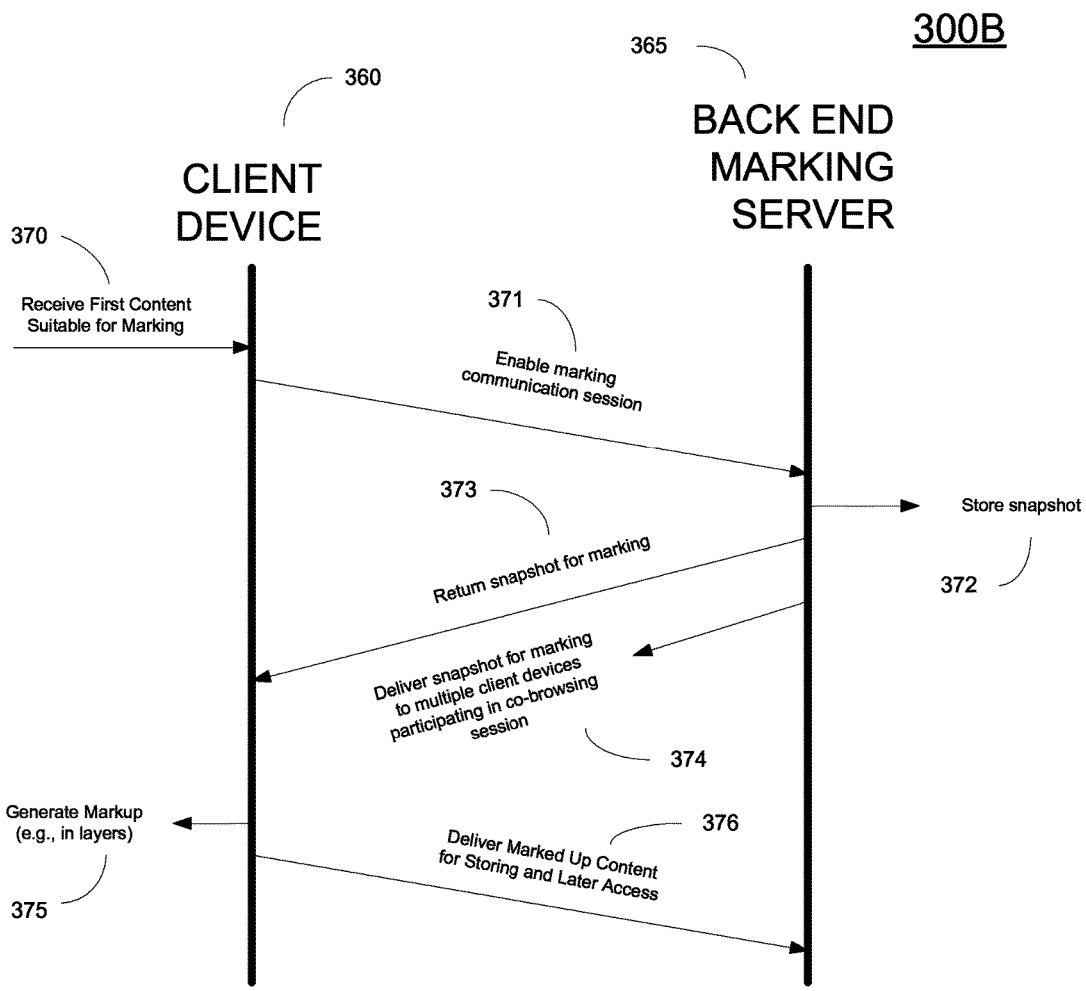
FIG. 3B is an illustration of the flow of data when marking web content through a web browser implementation, in accordance with one embodiment of the invention.

FIG. 3B is an illustration 300B of the flow of data when marking web content through a web browser implementation, in accordance with one embodiment of the invention. An illustrative web marking architecture is shown in FIG. 3B, and includes a third party web content provider (not shown), a back end markup server 365, a web browser at a client device 360, and a markup interface as implemented by the web browser.

In the present embodiment, at 370 first content is received by the web browser of the client device 360. In one implementation, the first content is received from a third party content provider. In another implementation, the first content is generated by the client device, and rendered by the web browser.

When the marking functionality is activated, at 371, a marking communication session is established between the client device 360 and the back end marking server. This activates the marking functionality on the client device, and also provides an avenue for storing the various information collected during the marking process (e.g., the snapshot including the first content and settings, the marked up content, etc.). For instance, application code is executed and implemented through the web browser (e.g., through extensions, plug-ins, etc.) to enable the marking functionality.

Also, when invoked for marking, the application code will take a snapshot of the browser's rendering state (e.g., the web page served from the third party content provider), and then initiate a communication with the back end marking server 365 to store that snapshot at the back end marking server, at 372.

At 373, the snapshot is optionally returned for marking, and as such, the snapshot is delivered back to the client device 360. In another implementation, the snapshot present at the client device 360 is used for marking. More particularly, the client device is redirected to the back end markup server so that marking functionality is fully enabled. In one embodiment, the back end marking server initiates and provides the marking functionality that is implemented through the web browser on the client device 360. For instance, the marking functionality is provided by the back end marking server through a bookmarklet shortcut implemented through the web browser of the client device 360.

At 374, the snapshot is delivered to multiple client devices. For instance, the multiple client devices may be participating in a co-browsing session. As such, the snapshot is delivered to each of the client deices, so that marking is enabled by any of the web browsers associated with the client device in the co-browsing session. That is, the snapshot is presented to two or more client devices participating in a co-browsing session to enable marking by any of the client devices.

In still another embodiment, the back end marking server delivers a snapshot of the finalized marked up content to each of the client device for rendering by a corresponding web browser for discussion in a co-browsing session. That snapshot is further presented for additional marking, in embodiments of the invention.

At 375, the marking application implemented through the web browser provides several methodologies by which the user can interact with to make markings on the first content, or the snapshot of the first content. Marked up content is generated, that comprises the snapshot and the markings, or markup. At 376, the marked up content is delivered to the back end marking server for storing and later access, either through a single session, or co-browsing session.

As such, the marked up content is sharable, by delivering the marked up content to any device with a web browser. For example, the stored marked up content may be associated with a link. That link is deliverable to third parties (e.g., friends, family, etc.). Any delivery method is suitable. For instance, the link may be delivered through an email, or message board, or message, etc. Further, a request for the marked up content may be received at the back end marking server in response to activation of the link by a requesting party. As a result, the marked up content is transmitted to a computing resource that is associated with the requesting party.

In another embodiment, when first content is rendered at the client device 360 by a web browser, the marking application is executed through the web browser of the client device 360. That is, the web browser contains one or more native applications or extensions that enable the marking functionality. As such, the web browser extensions directly provide several means by which the user at the client device can interact with marking application to make marks or markings on the first content, as rendered.

Figure 4:
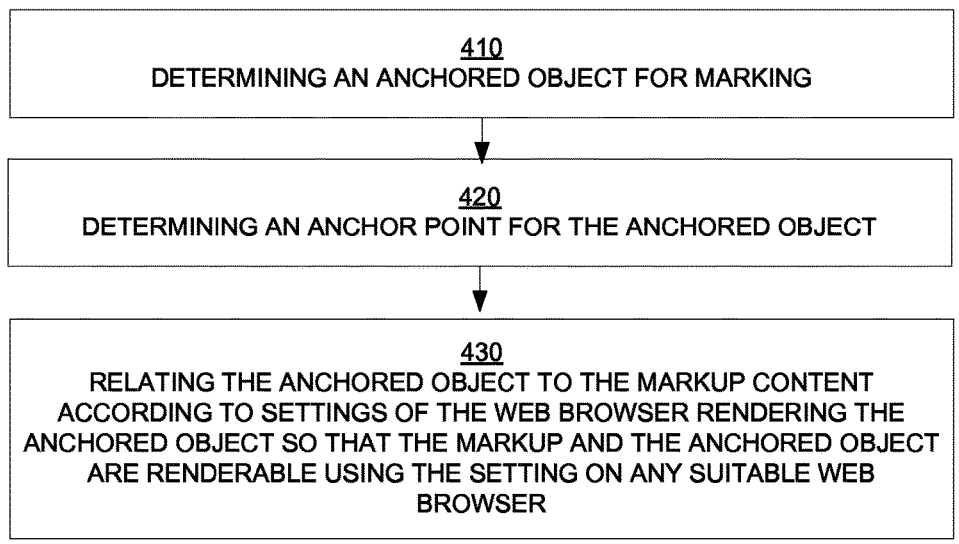
FIG. 4 is a flow diagram illustrating a method for positioning markup around an anchored object when marking web content through a web browser implementation, in accordance with one embodiment of the invention.

FIG. 4 is a flow diagram 400 illustrating a method and/or computer implemented method for positioning markup around an anchored object when marking web content through a web browser implementation, in accordance with one embodiment of the invention. In another embodiment, flow diagram 400 is implemented within a computer system including a processor and memory coupled to the processor and having stored therein instructions that, if executed by the computer system causes the system to execute a method for positioning markup around an anchored object when marking web content through a web browser implementation. In still another embodiment, instructions for performing a method are stored on a non-transitory computer-readable storage medium having computer-executable instructions for causing a computer system to perform a method for positioning markup around an anchored object when marking web content through a web browser implementation. The method outlined in flow diagram 400 is implementable by one or more components of the computer system 100 and system 200 of FIGS. 1 and 2, respectively.

The method outlined in flow diagram 400 is implemented when marking first content, wherein the first content is renderable by a web browser, or by more than one web browser participating in a co-browse session. In the present embodiment, the marking or markup of first or web content is accomplished without natively installing an application on the client side web browser. For instance, the client side web browser is configured to call a JavaScript function that performs the marking. The JavaScript function is called from a back end marking server, in one implementation. The JavaScript function may be called using a bookmarklet of the web browser. As such, the JavaScript format avoids installation of an application, or extension on the client device. A marking or markup is associated with at least one object. For example, a markup may point to a specific portion of the first content, and further provide a note in relation to that specific portion. In this case, a snapshot of the web content is not necessary, because the markup is rendered in relation to a corresponding anchored object, and not necessarily to the entire snapshot of the first content or web content. As such, embodiments of the present invention are able to define a relationship between that note as markup and that specific portion, so that when subsequently rendered, the note and the specific portion of the first content maintains that same relationship.

At 410, the method includes determining an anchored object for marking. When the first content is first rendered by the web browser of the user who is marking up the first content, the settings of the web browser are captured and stored. In addition, the object to which the marking is directed to is identified, according to the web browser settings. In one embodiment, the user is prompted to indicate which object is targeted for marking. For instance, various objects are automatically highlighted as a user moves a cursor over the first content. In one embodiment, the highlighted objects comprise html containers or elements, such as, word, form field, paragraphs, images, .div, partitions, etc. When the proper object is highlighted, the user may click on the highlighted object to indicate a selection of that object as the target object. In other embodiments, the object is automatically selected based on various parameters.

At 420, the method includes determining an anchor point for the object, wherein the object comprises an html container anchored to an anchor point according to settings of the web browser. For instance, the anchor point may comprise an html anchor point that identifies where the targeted object should be displayed in its corresponding web enabled content in relation to other objects, etc.

At 430, the method includes relating the anchored object to the markup according to settings of the web browser. In one implementation, the markup is generated on a canvas that is overlaid the anchored object. That canvas is positioned relative to the anchor point. As such, the markup, on the canvas, is placed relative to the anchor point of the anchored object when rendering the anchored object and markup. This provides for in situ marking of a selected object and/or anchored object. In one embodiment, the markup and the anchored object are renderable using the originally captured settings on any suitable web browser. For instance, a positional relationship may be defined between the markup and the anchored object and/or the anchor point of the anchored object. As such, when displaying the object according the originally captured settings, the markup is also displayed with the proper relationship to the object and/or anchor point of the object. By determining the relationship between the markup and the anchor point, it is not necessary to use a snapshot defining the rendering dimensions of every element on the page associated with the first content. In another embodiment, objects that are not targeted or not anchored are renderable using any preferred setting of any suitable web browser, as will be described below. In short, the markup and the anchored object are displayed with their correct relationship using the originally captured settings, while other objects in the first content may be displayed using other settings. That is, the marking is performed in place and in relation to an anchored object, such that the markup is anchored to a single element or object on the page of the first content.

For example, in one embodiment, the relationship defined between the anchored object and the markup is a positional relationship. That is, using x and y coordinates, for example, the location of the anchor point and object is determined as originally rendered, and then the marking is positioned according to the anchor point with the proper relationship, according to the originally captured settings. Subsequent viewing of the anchored object and its markup is also rendered according to the originally captured settings, on a different web browser, and even though other non-anchored elements are rendered with different and preferred settings.

Figure 5A:
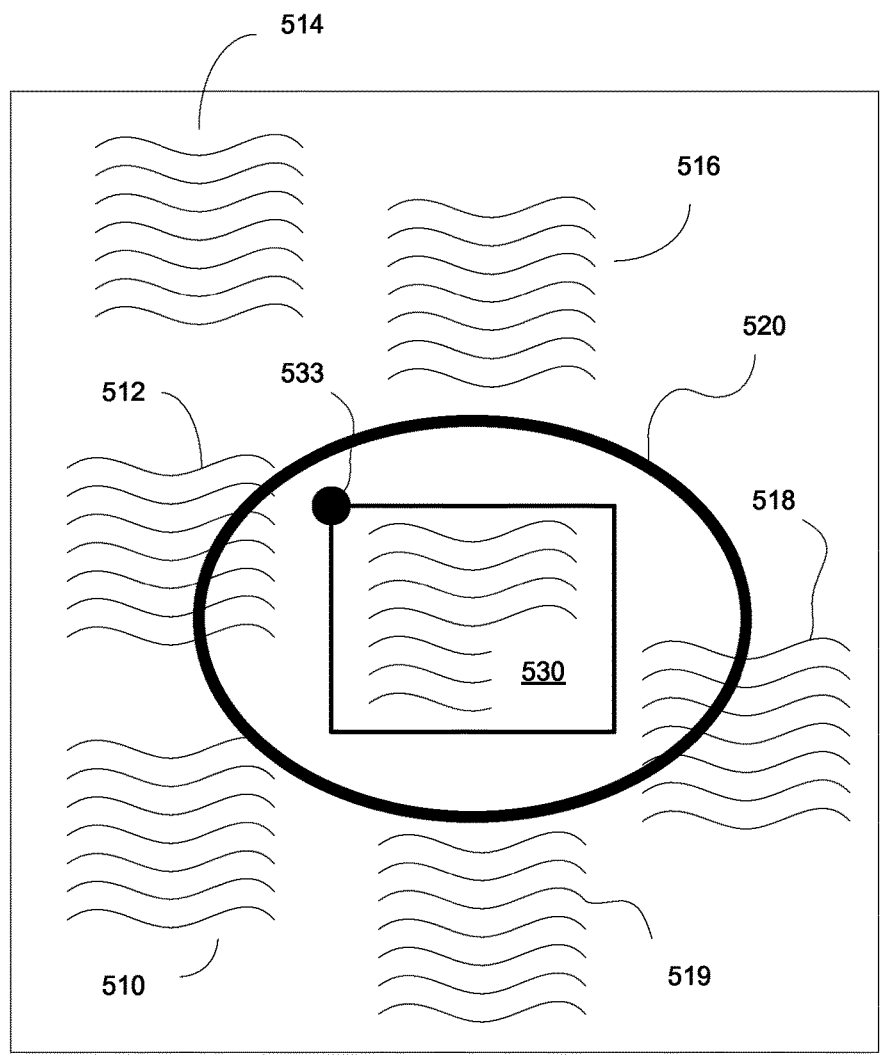
FIG. 5A is an illustration of web content showing the positional relationship of markup to an anchored object when marking web content through a web browser implementation, in accordance with one embodiment of the invention.

FIG. 5A is an illustration of web content 505 or first content showing the positional relationship of markup 520 to an anchored object 530 when marking web content through a web browser implementation, in accordance with one embodiment of the invention. As shown, the first content 505 includes multiple paragraphs of text. In addition, images may also be shown. Objects are identified as html containers, and include objects 510, 512, 514, 516, 518, 519, and 530.

Object 530 containing text is highlighted and selected as the targeted text to which markup is related. Further, an anchor point 533 for object 530 is determined. Also, a marking 520 is shown surrounding the targeted object 530. For instance, the marking or markup 520 may indicate that a user is interested in object 530, as an advertisements for a rental apartment. The web content 505 is marked up with the snapshot of the web content 505, the marking 520, as well as the targeted object 530. The marked up content may then be transmitted to another user.

Figure 5B:
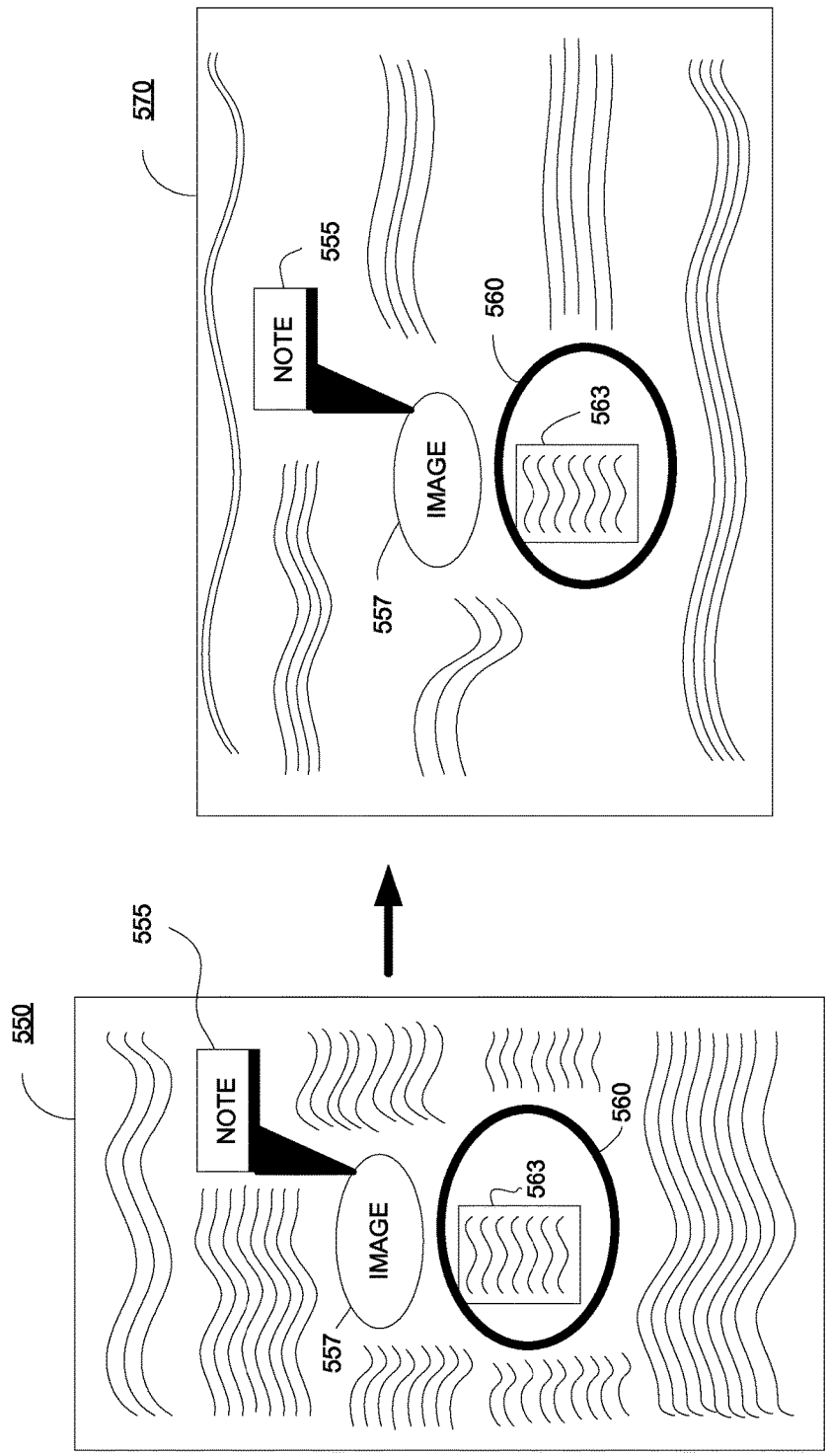
FIG. 5B is an illustration of the consistent presentation of markup and its associated anchored object when first captured and later rendered, wherein the markup and anchored object are rendered according to the settings of the web browser when first captured, in accordance with one embodiment of the invention.

FIG. 5B is an illustration of the consistent presentation of markup and its associated anchored object when first captured and later rendered, wherein the markup and anchored object are rendered according to the settings of the web browser when first captured, in accordance with one embodiment of the invention. As shown, first content is originally rendered by a first web browser in a window 550, according to originally captured settings. For example, the first content is displayed narrowly in window 550, such that the length of the page is longer than the width of the page of rendered, first content.

More particularly, a note 555 (e.g., textual note) is associated with an image object 557, wherein the note 555 comprises the markup, and the image object 557 comprise the anchored object. The positional relationship between them is such that the note 555 is positioned to the upper right side of the image 557. In addition, a circular marking or markup 560 is positioned around textual object 563. The anchored object 563 is positioned a little off-center from the marking 560, and is reflected in the positional relationship between the two.

The marked up content includes the snapshot of the original, first content (e.g., text and image) along with the markups 555 and 560. That marked up content is saved back at back end server, and can be later accessed for display, as previously described. For instance, window 570 indicates the display of the first content as rendered by a second web browser, according to the new preferred settings of the second web browser.

However, the anchored objects and their corresponding markings or markups are rendered according to the originally captured web browser settings. In that manner, the relationship (e.g., positional relationship) between an anchored object and its corresponding marking is maintained between the first browser and the second browser. For instance, note 555 as the marking and anchored object 557 as well as marking 560 and anchored object 563 are rendered according to the originally captured web browser settings.

Remaining non-anchored objects in the first content are rendered according to the settings of the second web browser. For instance, the first content as rendered by the second browser is displayed in window 570 more widely than in window 550, such that that width of the page is greater than the length of the page.

FIGS. 6A-N are illustrations of web content and a marking interface used to make markings on the web content, in accordance with embodiments of the present disclosure. For instance, FIG. 6A is a screenshot 600A of a web page or web content from a vendor, as rendered by a web browser. No marking functionality is shown.

FIG. 6B is a screen shot 600B of the same web page from the same vendor, as rendered, but with marking functionality implemented therein. For instance, a user has indicated the desire for marking the web page. As such, a markup interface or toolbar 605 is also rendered. The toolbar 605 includes a pencil marking feature, a brush feature 607, a text feature 608, an undo feature 609, a redo feature 610, and a share feature 611. These features are described more fully below in relation to FIGS. 6C-N.

In particular, FIG. 6C is a screen shot 600C of the same web page from the same vendor, as rendered, but with pencil feature 606 selected. For example, pencil feature 606 provides for a sketches style of marking. As shown various sizes of the penciled marking, as well as shades of the pencil marking are offered. The pencil feature 606 is a free form format for marking, wherein the user is mimicking the act of writing on a piece of paper, but is electronically writing on electronic web content.

FIG. 6D is a screen shot 600D of the same web page from the same vendor, as rendered, but with brush feature 607 selected. For example, brush feature 607 provides for a sketches style of marking. As shown various sizes of the brush markings, as well as shades of the brush markings are offered. The brush feature 607 is a free form format for marking, wherein the user is mimicking the act of brushing ink on a piece of paper, but is electronically brushing electronic ink on electronic web content.

FIG. 6E is a screen shot 600E of the same web page from the same vendor, as rendered, but with the text feature 608 selected. For example, text feature 608 provides for a note style of marking. As shown, a window 615 is configured to overly the web content. A textual note is typed into the window 615 through any suitable means, such as, an electronic keyboard. FIG. 6F is a screen shot 600F of the same web page as rendered continuing with the selection of the text feature 608. In addition, a font selector feature 616 (e.g., Verdana, etc.) is shown which is used to select the font of the typed text contained within window FIG. 6G is a screen shot 600G of the same web page as rendered continuing with the selection of the text feature 608. As shown, a rotation feature is illustrated, wherein the window 615, now containing text "I love this site! I love this tool . . . !" is shown rotated such that the window 615 tilts to the left. FIG. 6H is a partial view of a screen shot 600H of the same web page as rendered continuing with the selection of the text feature 608. As shown, a text size selector 619 is illustrated, and is used to select the size of the text "I love this site! I love this tool . . . !" shown in window 615. FIG. 6I is a partial view of a screen shot 600I of the same web page as rendered and continuing with the selection of the text feature 608. As shown, a text color selector 618 is illustrated, and is used to select the color of the text "I love this site! I love this tool . . . !" shown in window 615. FIG. 6J is a partial view of a screen shot 600J of the same web page as rendered and continuing with the selection of the text feature 608. As shown, a window background color selector 618 is illustrated, and is used to select the color of the background in the window 615 behind the text "I love this site! I love this tool . . . !".

FIG. 6K is a screen shot 600K of the same web page as rendered with the textual marking committed to the web page. That is, the final form of the note 622 or marked up content is shown without the textual marking interface of window 615. As such, the text is overlaid the web page, as rendered.

FIG. 6L is a screen shot 600L of the same web page from the same vendor, as rendered, but with the undo feature 609 selected. Selection of this feature will revert the marking back one or more steps. FIG. 6M is a screen shot 600M of the same web page from the same vendor, as rendered, but with the redo feature 610 selected. Selection of this feature re-performs the last action performed.

FIG. 6N is a screen shot 600N of the same web page from the same vendor, as rendered, but with the sharing feature 611 selected. Section of the sharing feature 611 allows for the copying of the marked up content, including the snapshot of the web page and the marked up content 622. A mailing function automatically invokes a default mail application, though other delivery methods are selectable. A tweeting function invokes a tweeting messaging user interface, and a posting function invokes a posting of the marked up content 622 to a home page of a user on a social network platform.

FIGS. 7A-7F are example markings of representative web contents in various use cases, in accordance with embodiments of the present invention. For instance, some illustrative use cases are described, as follows. In one implementation, a user may markup a web-served tutorial or homework page with specific corrections or clarifications in order to assist a student in understand that lesson or content. In another implementation, a user may markup a product detail page from a web-based retail site with comparison or preference information, and share with a friend or advisor in order to jointly collaborate on shopping/purchasing decisions. In still another implementation, a user may draw and note changes desired on a web site or other publication in order to provide edit or revision advice to the author or originator of that site or page. Also, a user may cross out sections or emphasize sections of blog or opinion/editorial articles in order to express disagreement or support, and then share with friends or others with interest in the issue addressed by the article. Use cases for marking up web content is unlimited, and certainly span the range of cases that were previously enabled by pen and pencil on paper.

Figure 7A:
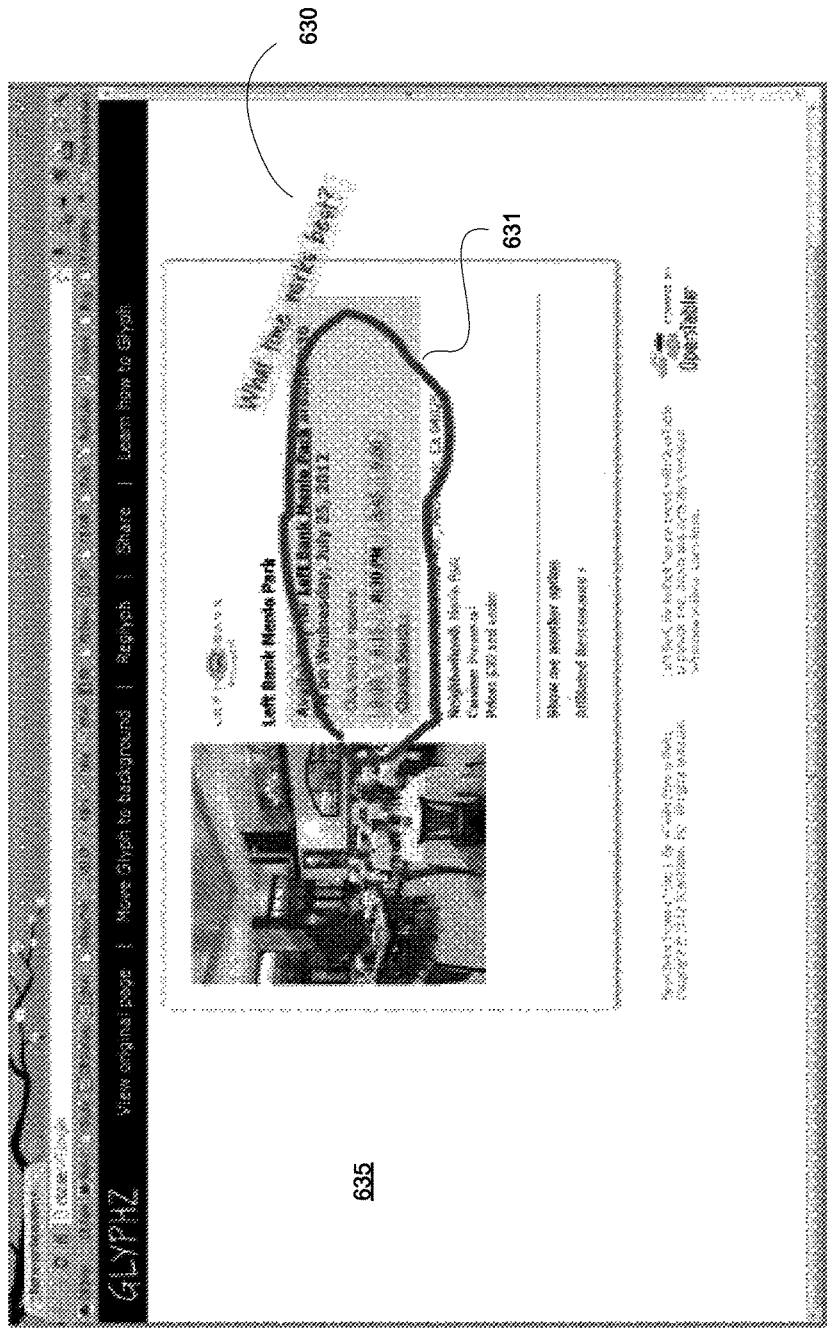

For example, FIG. 7A is a screenshot 700A of web content 635 that includes multiple markings. A use case may be that two friends are trying to determine when to meet for dinner at a restaurant, whose web site is providing the web content 635. One user has provided markings on a suggested restaurant, to include various times available for a dinner reservation. These times are circled with free hand marking 631. In addition, the user has included a textual note 630, which asks the second user to select a time.

Figure 7B:
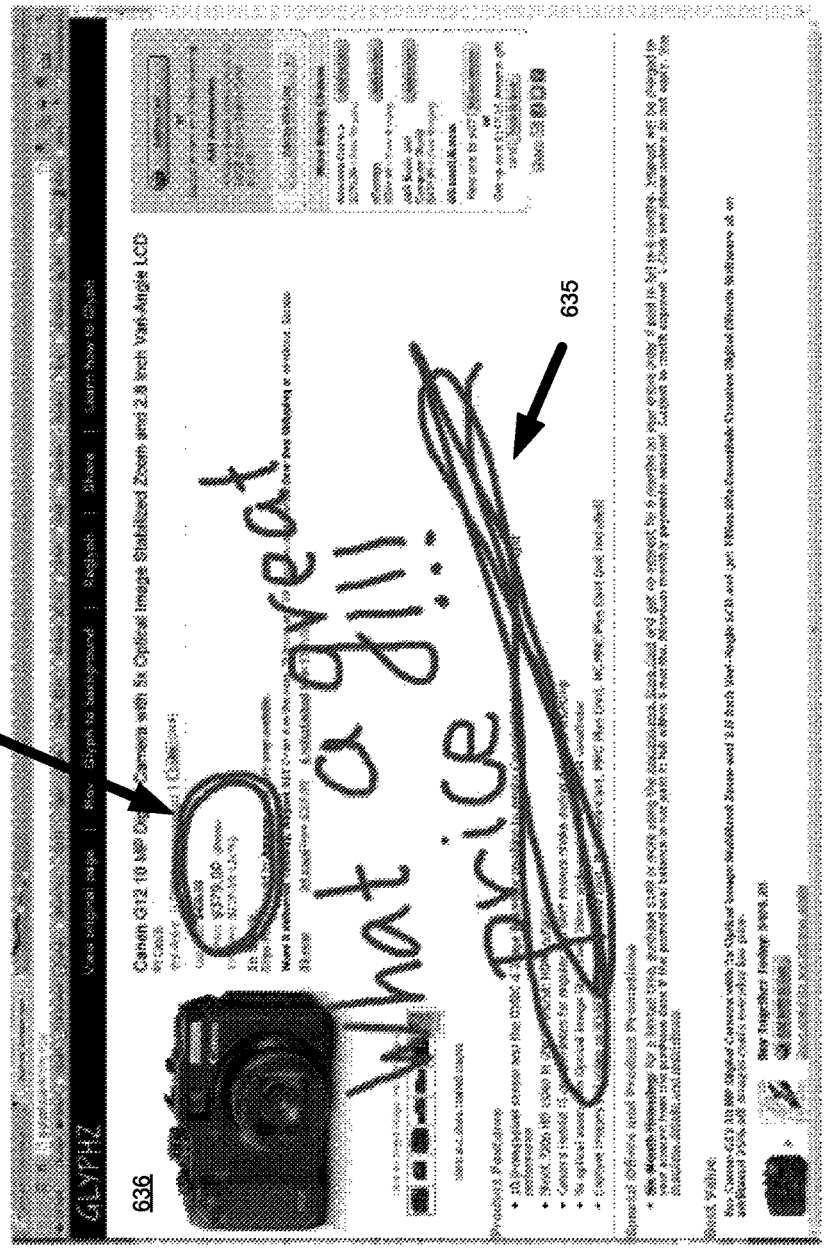

FIG. 7B is a screenshot 700B of web content 636 that includes multiple markings. The web content 636 includes a description of a particular camera. A use case may be that a first user is co-shopping with a second user. The first user provides markings to include a circle 637 marking outlining the price of the camera. In addition, a free hand note marking 635 is written to show that the circled price is a "great price." This marked up content may be used for later reference by the first user, or sent to the second user for comment.

Figure 7C:
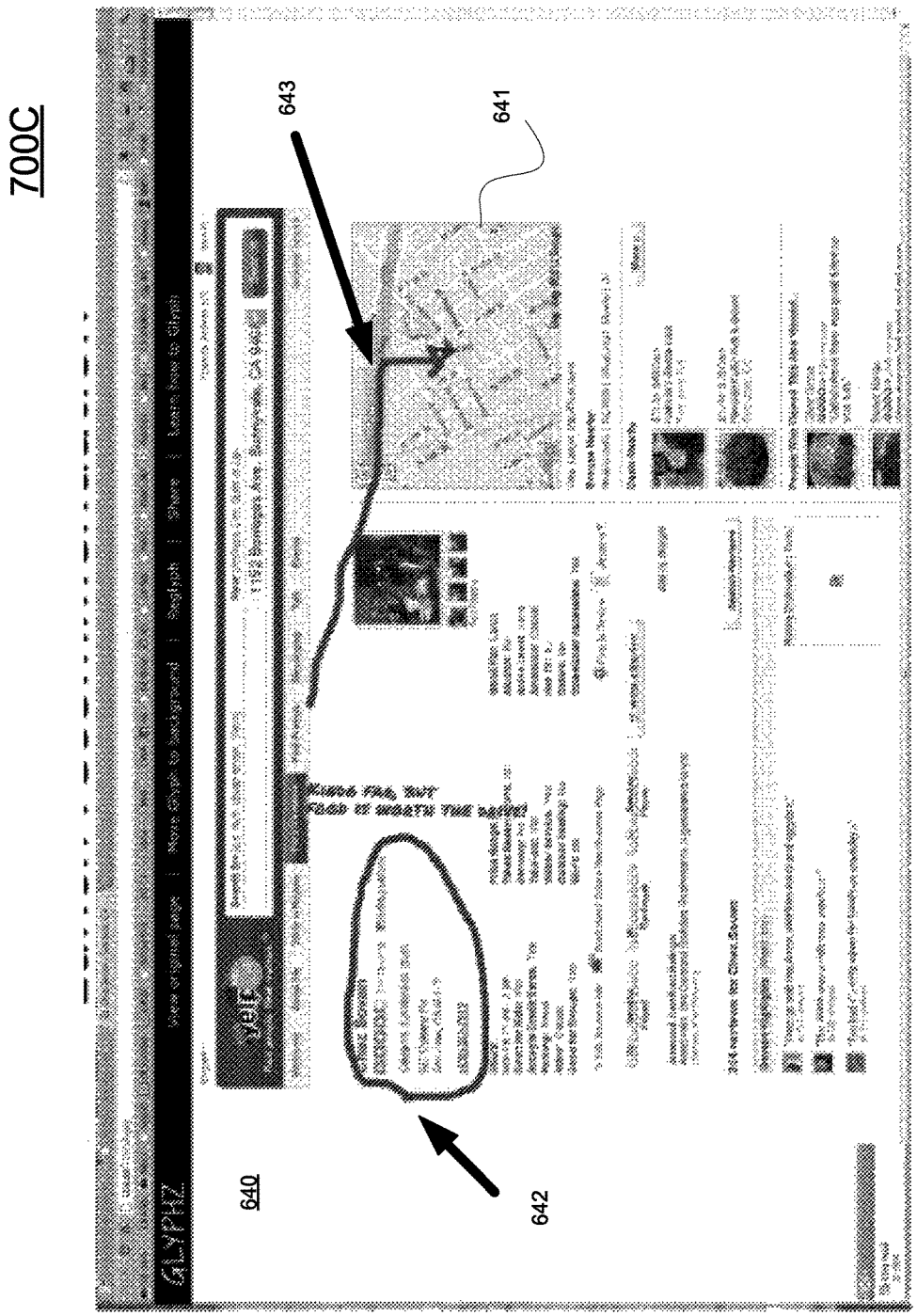

FIG. 7C is a screen shot 700C of web content 640 that includes multiple markings. The web content 640 includes a description of a restaurant, and an accompanying map 641 of the location of the restaurant. A use case may be that a first user wants to give directions to a second user on how to find the restaurant. The first user provides a first marking 642, which is a free form circle, outlining some information about the restaurant. In addition, the first user also provides a second marking 643 which directs the second user to the map used to locate the restaurant.

Figure 7D:
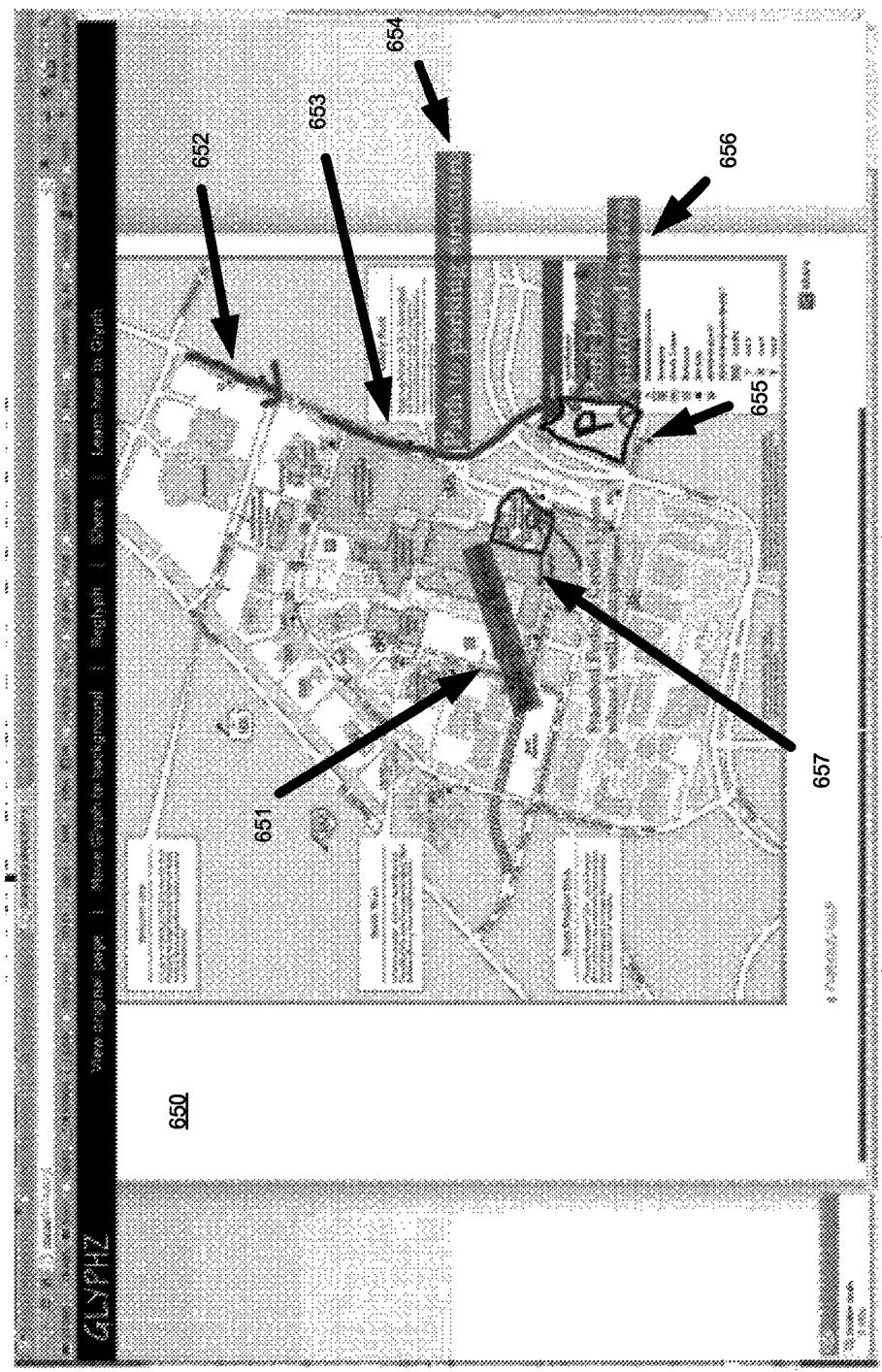

FIG. 7D is a screen shot 700D of web content 650 that includes multiple markings. The web content 650 includes a map of a hospital campus. A use case may be that a first user is providing the map and directions to a second user on how to find the emergency room, and on where to park. As such, a first user is able to markup a map (e.g., from Google Maps, or Bing, or other Internet mapping service), and hand-draw specific directions, landmarks, or text to further clarify for someone else. This marked up content is then be sent to others who otherwise wouldn't be able to get these additional clarifications, and would only have access to the base mapping information from the Internet mapping service. In particular, the first user highlights the location of the emergency room with a free hand outlined box 657. In addition, the first user labels the box 657, as the emergency room with a note 651 markup. Further, driving directions are provided with arrow markings 652 and 653. In addition, a note 654 clarifying the use of the arrows 652 and 653 is provided specifying that these indicate the path to the parking structure. The location of the parking structure is outlined with a free hand outlined box 655. A note accompanying the box 655 indicating an instruction to park at the structure outlined by box 655, and that the parking is metered.

Figure 7E:
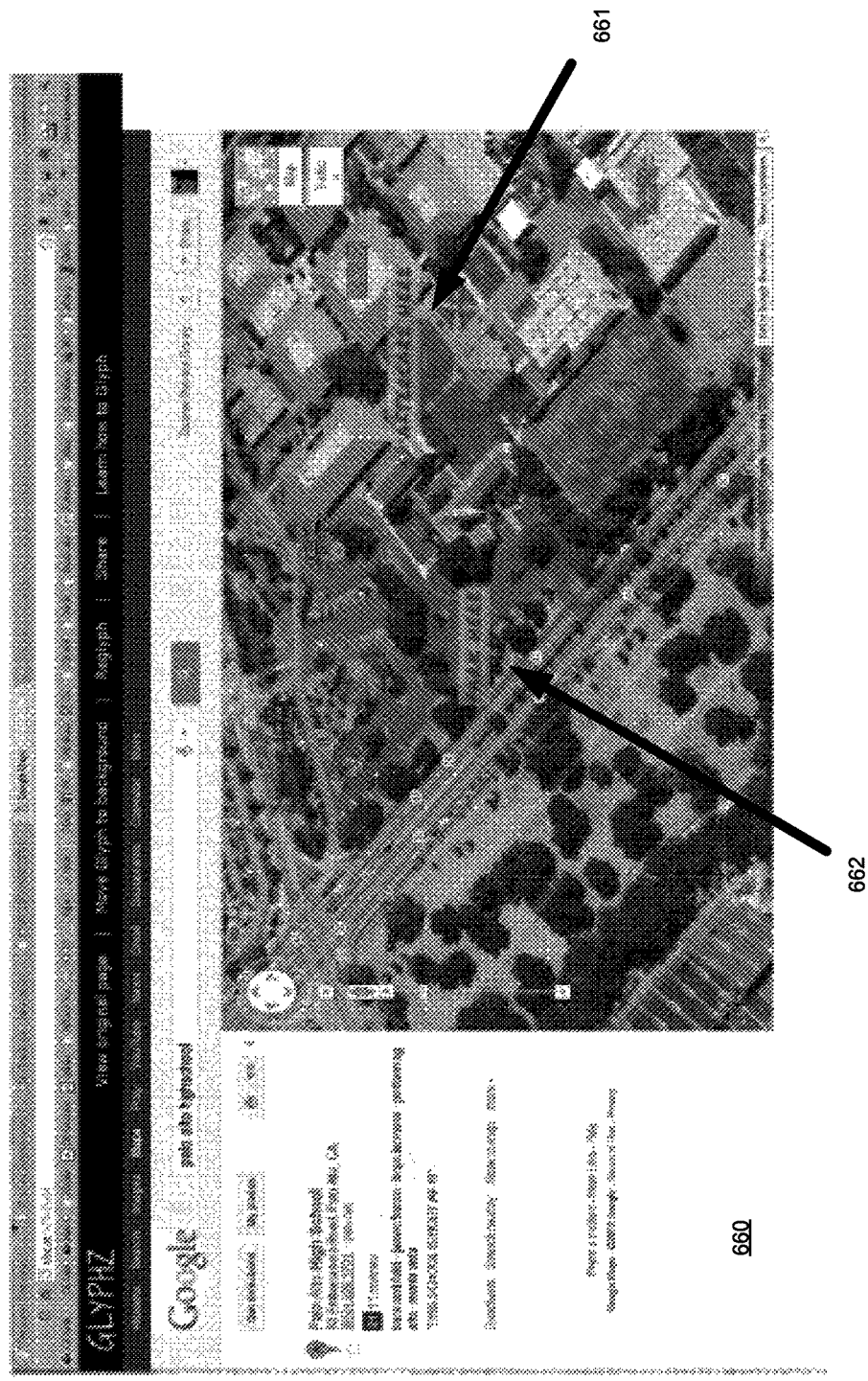

FIG. 7E is a screen shot 700E of web content 660 that includes multiple markings. The web content includes a satellite view map of a school campus. A use case may be that a first user is providing the map and directions to a second user on how to find the day care center in order to pick up kids, and on where to park. As such, a first user is able to markup the map provided in web content 660. In particular, the first user highlights the location of parking, with a freehand note 662 that indicates where the parking is located. In addition, the first user highlights the location of the aftercare center, with a freehand note 661.

Figure 7F:
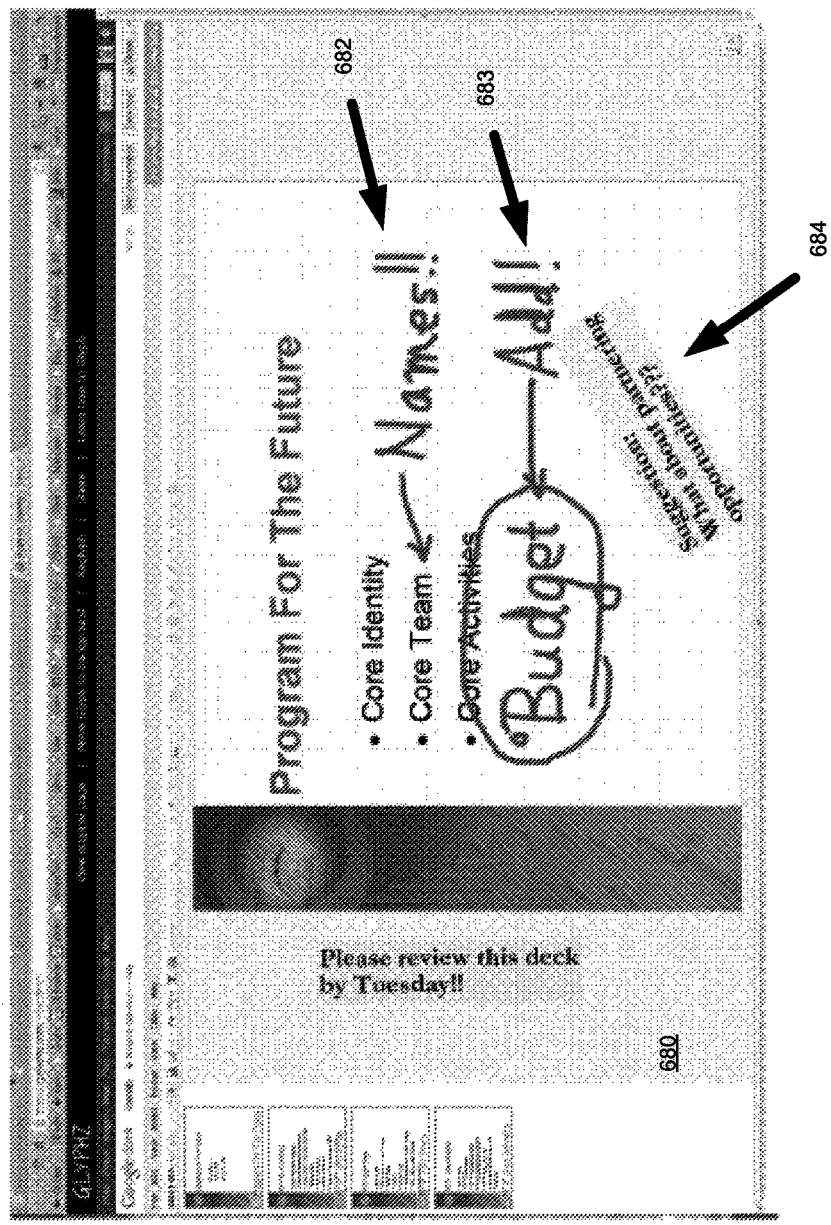

FIG. 7F is a screen shot 700F of web content 680 that includes multiple markings. The web content includes a document file of a first format that is not renderable by a web browser. For instance, the first format may be a pdf file, or a power point file. The document file of the first format is translated into a form that is suitable for rendering by a web browser, such as, html or image file formatting, for purposes of marking. A use case may be that a power point is generated identifying some goals for a company. A first user wants to comment on the power point slide, and provide those comments to a team of other users. In particular, the first user is able to highlight the need to identify who should be on the core team, through a freehand note 682 requesting "Names". Also, the first user wants to add another bullet, and does so by a freehand markup 683 that indicates that another bullet labeled "Budget" should embodiment added. Further, another marking 684 is a textual markup that asks about "partnering opportunities."

Thus, according to embodiments of the present disclosure, systems and methods are described providing for web page markup.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered as examples because many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. These software modules may configure a computing system to perform one or more of the example embodiments disclosed herein. One or more of the software modules disclosed herein may be implemented in a cloud computing environment. Cloud computing environments may provide various services and applications via the Internet. These cloud-based services (e.g., software as a service, platform as a service, infrastructure as a service, etc.) may be accessible through a Web browser or other remote interface. Various functions described herein may be provided through a remote desktop environment or any other cloud-based computing environment.

Although the present invention and its advantages have been described in detail, it should be understood that various changes substitutions, and alterations can be made herein without departing from the spirit and scope of the invention as defined by the appended claims. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

Embodiments according to the present disclosure are thus described. While the present disclosure has been described in particular embodiments, it should be appreciated that the disclosure should not be construed as limited by such embodiments, but rather construed according to the below claims.

What is claimed:

1. A method, comprising:

generating a first rendering of first content at a client device with a first web browser of said client device, said first content comprising a plurality of objects, said objects comprising a first object and a second object;

capturing a snapshot of said first rendering of said first content, wherein said first object and said second object are rendered according to settings of said first web browser;

receiving an input selecting said first object but not said second object;

receiving markup associated with said first object but not said second object;

generating a second rendering of marked up content comprising said snapshot and said markup;

determining first spatial coordinates defining a location of an anchor point for said first object in said second rendering and determining second spatial coordinates defining a location of said markup in said second rendering, wherein a positional relationship between said first object and said markup in said second rendering is established using said first and second spatial coordinates and wherein said first and second spatial coordinates are included in said settings for said first web browser; and storing said marked up content for later access, wherein when accessed by a second web browser, said marked up content except for said first object and said markup is rendered in a window according to settings of said second web browser, wherein said first object is rendered in said window at a location defined by said first spatial coordinates and according to said settings of said first web browser and said markup is rendered in said window at a location defined by said second spatial coordinates and according to said settings of said first browser, thereby maintaining said positional relationship, and wherein said settings of said second web browser are different from said settings of said first web browser.

2. The method of claim 1, wherein said first content is selected from the group consisting of html formatted content and image formatted content.

3. The method of claim 2, further comprising:

receiving a file of a first format; and translating said file of said first format into a translated file of said image formatted content that is renderable by any suitable web browser.

4. The method of claim 1, further comprising:

redirecting said client device to a back end server;

storing said snapshot on said back end server; and delivering said snapshot back to said client device for marking.

5. The method of claim 1, further comprising:
transmitting said marked up content from said client device to a back end server.

6. The method of claim 1, further comprising:
presenting said snapshot to two or more client devices participating in a co-browsing session for marking by any of said two or more client devices.

7. The method of claim 1, wherein said storing further comprises:
storing said marked up content at said back end server.

8. The method of claim 7, further comprising:
associating said stored marked up content with a link that is deliverable to third parties;
receiving a request for access in response to activation of said link by a requesting party; and
transmitting said marked up content to a computing resource of said requesting party.

9. The method of claim 1, wherein said second object is renderable using any preferred setting of any suitable web browser.

10. The method of claim 1, further comprising:
rendering said marked up web content with a third web browser;
capturing a second snapshot of said marked up web content as rendered according to settings of said third web browser;
receiving second markup in association with said second snapshot;
generating second marked up web content comprising said second snapshot and said second markup; and
storing said second marked up web content for later access.

11. The method of claim 1, wherein said markup is taken from a group consisting essentially of:
free hand markup;
notes;
stamped images;
video;
audio;
animation; and
graphics interchange format (GIF) data.

12. The method of claim 1, further comprising:
embedding a link to a page of a web site providing said first content into said marked up content, wherein activation of said link through any suitable web browser redirects said web browser to said page.

13. A system, comprising:
a first web browser configured for generating a first rendering of first content on a first client device, said first content comprising a plurality of objects, said objects comprising a first object and a second object;
a capture module coupled to said first web browser and configured for capturing a snapshot of said first rendering of said first content, wherein said first object and said second object are rendered according to settings of said first web browser; and
a marking module coupled to said capture module and configured for receiving an input selecting said first object but not said second object, for receiving markup associated with said first object but not said second object, for generating a second rendering of marked up content comprising said snapshot and said markup, and for determining an anchor point for said first object in said second rendering and a location of said markup in said second rendering, wherein said anchor point comprises first (x,y) coordinates and said location of said markup comprises second (x,y) coordinates, wherein a positional relationship between said first object and said markup in said second rendering is established using said first and second (x,y) coordinates and wherein said first and second (x,y) coordinates are included in said settings for said first web browser, wherein said marked up content is stored for later access by a second client device; wherein when accessed by said second client device, said marked up content except for said first object and said markup is rendered in a window at said second client device according to settings of a second web browser of said second client device, wherein said first object is rendered in said window at said second client device at a location defined by said first (x,y) coordinates and according to said settings of said first web browser and wherein said markup is rendered in said window at a location defined by said second spatial coordinates and according to said settings of said first browser, thereby maintaining said positional relationship, and wherein said settings of said second web browser are different from said settings of said first web browser.

14. The system of claim 13, further comprising:
a back end server configured for storing said marked up content for later access.

15. The system of claim 13, further comprising:
a back end server configured for acting as a target of a redirect of said first client device to enable said system on said first client device, and configured for storing said snapshot and for delivering said snapshot back to said client device for marking.

16. The system of claim 13, wherein said first content is selected from the group consisting of html formatted content and image formatted content.

17. The system of claim 13, wherein said marking module is implemented as a web bookmarklet.

18. The system of claim 13, wherein said marking module is implemented as a web extension.

19. A non-transitory computer-readable medium having computer-executable instructions for causing a computer system to perform a method comprising:
generating a first rendering of first content with a first web browser, said first content comprising a plurality of objects, said objects comprising a first object and a second object;
capturing a snapshot of said first rendering of said first content, wherein said first object and said second object are rendered according to settings of said first web browser;
receiving an input selecting said first object but not said second object;
receiving markup associated with said first object but not said second object;
generating a second rendering of marked up content comprising said snapshot and said markup;
determining first (x,y) coordinates defining a location of an anchor point for said first object in said second rendering and determining second (x,y) coordinates defining a location of said markup in said second rendering, wherein a positional relationship between said first object and said markup in said second rendering is established using said first and second (x,y) coordinates and wherein said first and second (x,y) coordinates are included in said settings for said first web browser; and storing said marked up content for later access, wherein when accessed said marked up content except for said first object and said markup is rendered in a window according to settings of a second web browser, wherein said first object is rendered in said window at a location defined by said first (x,y) coordinates and according to said settings of said first web browser and said markup is rendered in said window at a location defined by said second (x,y) coordinates and according to said settings of said first browser, thereby maintaining said positional relationship, and wherein said settings of said second web browser are different from said settings of said first web browser.

\* \* \* \* \*